US006629087B1

(12) United States Patent
Benson et al.

(10) Patent No.: US 6,629,087 B1
(45) Date of Patent: Sep. 30, 2003

(54) METHODS FOR CREATING AND EDITING TOPICS FOR VIRTUAL ROBOTS CONVERSING IN NATURAL LANGUAGE

(75) Inventors: Scott S. Benson, Burlingame, CA (US); Walter A. Tackett, San Francisco, CA (US); Ray S. Dillinger, Novato, CA (US)

(73) Assignee: Nativeminds, Inc., San Francisco, CA (US)

( * ) Notice: Subject to any disclaimer, the term of this patent is extended or adjusted under 35 U.S.C. 154(b) by 0 days.

(21) Appl. No.: 09/271,665

(22) Filed: Mar. 18, 1999

(51) Int. Cl.[7] .................................................. G06N 5/02
(52) U.S. Cl. ........................ 706/11; 345/841; 704/2
(58) Field of Search ............................ 706/11; 345/841; 704/2, 8, 9, 252, 254

(56) References Cited

U.S. PATENT DOCUMENTS

| | | | | |
|---|---|---|---|---|
| 4,688,195 A | * | 8/1987 | Thompson et al. ............ | 706/11 |
| 4,887,212 A | * | 12/1989 | Zamora et al. ................. | 704/9 |
| 4,947,438 A | * | 8/1990 | Paeseler ....................... | 704/252 |
| 4,994,966 A | * | 2/1991 | Hutchins ....................... | 704/9 |
| 5,111,398 A | * | 5/1992 | Nunberg et al. ............... | 704/9 |
| 5,161,110 A | | 11/1992 | Dorchak | |
| 5,371,807 A | | 12/1994 | Register et al. | |
| 5,384,893 A | | 1/1995 | Hutchins | |
| 5,442,786 A | | 8/1995 | Bowen | |
| 5,510,981 A | * | 4/1996 | Berger et al. .................. | 704/2 |
| 5,526,407 A | | 6/1996 | Russell et al. | |

(List continued on next page.)

FOREIGN PATENT DOCUMENTS

| | | |
|---|---|---|
| EP | 0 240 663 A2 | 10/1987 |
| WO | WO 98/55903 | 12/1998 |

OTHER PUBLICATIONS

Jay Earley, An efficient context–free parsing algorithm, Communications of the ACM, vol. 13, Issue 2 (Feb. 1970), ACM Press, New York, NY, USA, pp.: 94–102.*
Patrick A. V. Hall; Geoff R. Dowling, Approximate String Matching, ACM Computing Surveys (CSUR), vol. 12, Issue 4 (Dec. 1980), pp.: 381–402.*
Li Li; Bryant, B.R., Parsing unification categorial grammar with object–oriented knowledge, Tools with Artificial Intelligence, 1994. Proceedings., Sixth International Conference on, 1994, pp.: 33–39.*
Fred, A.L.N.; Leitao, J.M.N., An heuristic–based context–free parsing algorithm, Acoustics, Speech, and Signal Processing, 1993. ICASSP–93., 1993 IEEE International Conference on, vol.: 2, Apr. 27–30, 1993, pp.: 67–70 vol. 2.*

(List continued on next page.)

Primary Examiner—Wilbert L. Starks, Jr.
(74) Attorney, Agent, or Firm—Morrison & Foerster LLP

(57) ABSTRACT

Automated methods are provided for the editing and authoring of topic scripts for the dynamic operation of virtual robots. A virtual robot, or BOT, processes natural language input from a user to effect certain actions according to user input. Typically, BOTs are constructed using topic scripts. Topic scripts may comprise example statements that typify the topic in question and patterns that are matched against user input to determine if the topic is activated by the user input. The steps of one embodiment of the present invention comprise: for an example statement associated with a topic script; testing said example statement against patterns in the topic script to determine if said example statement activates said topic; then for a word in an example statement not activating said topic: identifying zero or more pattern lists matching said word; then choosing one action from among a group of actions comprising: keeping said word; and replacing said word with a pattern list; then adding zero or more revised patterns to said topic script.

26 Claims, 15 Drawing Sheets

U.S. PATENT DOCUMENTS

| | | | |
|---|---|---|---|
| 5,535,323 | A | 7/1996 | Miller et al. |
| 5,553,218 | A | 9/1996 | Li et al. |
| 5,568,639 | A | 10/1996 | Wilcox et al. |
| 5,587,903 | A | 12/1996 | Yale |
| 5,600,765 | A | 2/1997 | Ando et al. |
| 5,606,712 | A | 2/1997 | Hidaka |
| 5,642,519 | A * | 6/1997 | Martin .......................... 704/9 |
| 5,682,539 | A | 10/1997 | Conrad et al. |
| 5,712,987 | A | 1/1998 | Waits et al. |
| 5,721,845 | A * | 2/1998 | James et al. ................ 345/841 |
| 5,758,323 | A | 5/1998 | Case |
| 5,760,768 | A | 6/1998 | Gram |
| 5,801,710 | A | 9/1998 | Cok et al. |
| 5,835,087 | A | 11/1998 | Herz et al. |
| 5,864,844 | A | 1/1999 | James et al. |
| 5,877,759 | A | 3/1999 | Bauer |
| 5,894,311 | A | 4/1999 | Jackson |
| 5,924,089 | A | 7/1999 | Mocek et al. |
| 5,974,405 | A | 10/1999 | McGuiness et al. |
| 5,995,921 | A | 11/1999 | Richards et al. |
| 6,012,055 | A | 1/2000 | Campbell et al. |

OTHER PUBLICATIONS

Allen, J., (1995). Chapter 14, pp. 429–461; Chapter 16, pp. 503–537; and Chapter 17, pp. 541–576 in *Natural Language Understanding*, The Benjamin/Cummings Publishing Company, Inc.

Cohen, R.(Jan.–Jun. 1987). "Analyzing the Structure of Argumentative Discourse," *Computational Linguistics* 13(1–2):11–24.

Grosz, B. et al.. (1987). "TEAM: An Experiment in the Design of Transportable Natural–Language Interfaces," *Artificial Intelligence*, Elsevier Science Publishers B. V., North Holland, 32:173–243.

Grosz, B. J. et al. (eds.), (1986). "The Representation and Use of Focus in a System for Understanding Dialogs" In *Readings in Natural Language Processing*. B.J. Grosz et al. eds., Morgan Kaufmann Publishers, Inc., pp. 353–362.

Grosz, B.J. and C. Sidner (Jul.–Sep. 1986). "Attention, Intentions, and the Structure of Discourse," *Computational Linguistics* 12(3):175–204.

Hirschberg, J. et al.. (1993). "Empirical Studies on the Disambiguation of Cue Phrases," *Computational Linguistics* 19(3):501–530.

Kaplan, R. (1975). "A General Syntactic Processor" In *Natural Language Processing*, Rustin, R. (ed.), Courant Computer Science Symposium 8: Dec. 20–21, 1971, Algorithmics Press, Inc., New York, pp. 193–241.

Litman, D. et al.. (1987). "A Plan Recognition Model for Subdialogues In Conversations," *Cognitive Science* 11:163–200.

Reichman, R. (1978). "Conversational Coherency," *Cognitive Science* 2:283–327.

Reichman, R.. (1985). *Getting Computers to Talk Like You and Me*–A Bradford Book, The MIT Press, "Chapter 2: Relations between Discourse Elements" pp. 21–33; "Chapter 5: Surface Linguistic Phenomena" pp. 67–90; and "Chapter 8: Cognitive Processing and the Context Space Theory" pp. 155–166.

Sidner, C. L. (1986). "Focusing in the Comprehension of Definite Anaphora" *In Readings in Natural Language Processing*. B.J. Grosz et al. eds., Morgan Kaufmann Publishers, Inc., pp. 363–394.

Sidner, C. L.. (1985). "Plan Parsing For Intended Response Recognition in Discourse," *Comput. Intell.* 1:1–10.

* cited by examiner (Web Interface Case)

(Chat Site/Virtual World Interface Case)

FIG. 10

Topic Wizard – Edit Patterns

?DescriptionQuestion:
"the markets for Neuromedia products"

PatternLists:
ARTICLES
OPTARTICLE
STDP.ARTICLES

Contents:
\'s
a
an
her
his
my
our
some
the
their
these
those
your

Keep first word
Drop first word
Replace with PatternList
Create new PatternList

Thesaurus Lists:

Use all default patterns

<Back   Next>   Cancel   Help

FIG. 13

Topic Wizard – Edit Patterns

?DescriptionQuestion:
"*markets*Neuromedia products"

PatternLists:
- NEUROMEDIASYNONYM
- PRODUCTS

Contents:
- Neuromedia#
- Neuromedia,s company#
- Neuromedia,s corporatio
- Neuromedia,s employer#
- NM#
- NM,s#
- NMI#
- NMI,s#
- Shallow Red,s company#
- Shallow Red,s corporatio
- Shallow Red,s employer#
- the company#
- the corporation#*
- the employer#
- this company#

Thesaurus Lists:

[Keep first word]
[Drop first word]
[Replace with PatternList]
[Create new PatternList]

[Use all default patterns]

[<Back] [Next>] [Cancel] [Help]

```
Neuromedia.g [UNSAVED]

Topic "What is Neuromedia?" is
Subjects "NEUROMEDIA";
    If ?DescriptionQuestion Contains "Neuromedia" Then
        Example "What is Neuromedia?";
        Say "Neuromedia is a small software company.";
    Done
EndTopic Topic "Neuromedia's markets" is
Subjects "Neuromedia", "market";
    If ?DescriptionQuestion Contains "Neuromedia#*market",
       "*markets*" + NEUROMEDIASYNONYM + PRODUCTS
    Then
        Say "Neuromedia's markets included customer service and on-line sales";
        Example "What are Neuromedia's markets?",
                "What are the markets for Neuromedia products?",
                "What are the markets for your company's software?";
    Done
EndTopic
```

FIG. 15

METHODS FOR CREATING AND EDITING TOPICS FOR VIRTUAL ROBOTS CONVERSING IN NATURAL LANGUAGE

FIELD OF THE INVENTION

The present invention relates to automatic methods for creating and editing topics for virtual robots conversing with users in natural language.

BACKGROUND OF THE INVENTION

In the following co-pending and co-assigned applications—Ser. No. 09/017,760 entitled "Methods for Automatically Verifying the Performance of a Virtual Robot", filed Feb. 3, 1998, and Ser. No. 08/868,713 entitled "Methods for Automatically Focusing the Attention of a Virtual Robot Interacting with Users", filed Jun. 4, 1997—herein incorporated by reference, methods are described for automatically focusing and verifying virtual robots. Virtual robots (or "BOTs") are generally software programs that interact and/or communicate with users (human, machine or otherwise) that take actions or make responses according to input from these users. A common use of such a BOT is as an interface to a web site wherein the administrator of that site has programmed the BOT to answer simple inquiries that are typically asked by visitors to the site. The above identified applications disclose methods for creating BOTs according to "scripts"—i.e. programs that are written in a very high level language that closely resembles a human natural language. These scripts embody a certain amount of information concerning the site that the administrator desires the BOT to communicate to a user during a connection session.

If a BOT is to be deployed in a publicly accessible way such as a web page or chat site, there is a need to test the BOT as thoroughly as possible to ensure that, as often as possible, it will produce an appropriate response to the inputs that it is likely to receive and the situations that it is likely to encounter. In this context, "input" refers to any description of a situation the BOT may encounter; although the most common inputs are textual inputs from users, inputs can be actions taken by users, external circumstances, or even events internal to the BOT such as an internal alarm clock. If the BOT can be tested in advance, the person or organization that is deploying the BOT can be more certain of its likely performance, and errors can be detected in advance that might otherwise result in mistakes that could mislead users interacting with the BOT and/or reflect poorly on the authors or deployers of the BOT.

Historically, most BOTs have been tested manually, by having a human user or set of human users interact with the BOT and observe any errors it might make. Such testing is ordinarily done when the BOT is first written, and may continue throughout the lifetime of the BOT as changes are made to it. Testing can also be said to occur after deployment as users interact with the BOT; errors found through this form of testing indicate that the BOT has already made a mistake when publicly deployed. Thus, there is a need to test thoroughly before public deployment.

Such human testing, although usually necessary, has a number of drawbacks. First, it is time-consuming. A typical BOT may contain thousands of possible responses, all of which need to be tested. Second, it is usually incomplete. Unless the testers are given a list of all possible responses that should be tested, the testers will only cover a subset of the possible responses. Furthermore, if the response given to an input may depend on the context, there is an exponential number of response sequences that must be tested. Finally, it is difficult to maintain assurance as changes are made to the BOT. In most BOTs, each change can potentially affect the responses given to many other inputs, so the entire testing effort must be repeated for each set of changes that are made to the BOT.

In U.S. patent application Ser. No. 09/017,760 entitled "Methods for Automatically Verifying the Performance of a Virtual Robot", a method of automatically verifying BOT performance is disclosed in which "example" input statements are associated with particular categories such that the example input, when input into the running BOT, should activate that particular category. If that category is not activated as a result of inputting the example statement, a potential error condition is detected.

Once detected, there is a need for aiding the BOT author to correct the potential error by either extending the script description for the category in question, or authoring new categories so that the example statement is adequately handled by the system.

There is additionally a need for such an authoring system to operate on new examples suggested by the BOT author to aid in the creation of a wholly new topic.

There is additionally a need for such update and creation mechanisms to be as automated as possible so as to aid the human author for quick and accurate deployment of the virtual robot.

SUMMARY OF THE INVENTION

The present invention meets the aforementioned needs by providing automated methods of editing and authoring topic scripts. Typically, topic scripts comprise example statements that typify the topic in question and patterns that are matched against user input to determine if the topic is activated by the user input. The steps of one embodiment of the present invention comprise:

for an example statement associated with said topic script;
        testing said example statement against patterns in the topic script to determine if said example statement activates said topic;
        for a word in an example statement not activating said topic:
            identifying zero or more pattern lists matching said word;
            choosing one action from among a group of actions comprising:
                keeping said word; and
                replacing said word with a pattern list;
    adding zero or more revised patterns to said topic script.

In another aspect of the present invention, the script author may create an entirely new topic script from scratch using the automated methods of the present invention. The author would create new example statements initially that embody the topic that the author seeks to address. These new example statements would then be applied to the automated methods of the present invention in order to create patterns in order to "cover" the example statements—i.e. insure that the topic being created would be activated upon the input of the example statement in question.

In yet another aspect of the present invention, the associated example statements may be run through existing priority topics to produce patterns that are more specific to the topic at hand.

One advantage of the present invention is accuracy. The methods of the present invention help to debug topic scripts to ensure that the topics in question are in fact activated by the example statements associated with the topic.

Another advantage of the present invention is speed. The methods of the present invention are automated and implemented in simple dialog boxes to aid the script author in editing existing topic scripts or create entirely new scripts.

Yet another advantage is generality. The methods of the present invention help to produce topic scripts that answer questions broader than and/or synonymous to the literal example statements.

Other embodiments and advantages will be made clear by the following detailed description when read in conjunction with the drawing figures.

BRIEF DESCRIPTION OF THE DRAWINGS

FIGS. 10–14 show screen shots of dialog boxes that are used to automate the authoring of topic scripts in accordance with the principles of the present invention.

FIG. 15 shows a script file containing a topic that was created using the present invention.

DETAILED DESCRIPTION OF THE INVENTION

I. Overview and General Architecture

The term "robot" is used interchangeably with "BOT" throughout the remainder of this application. For the purposes of the present invention, both "BOT" and "robot" refer to any program which interacts with a user in some fashion, and should not be assumed to refer only to physically embodied robots.

Figure 1:
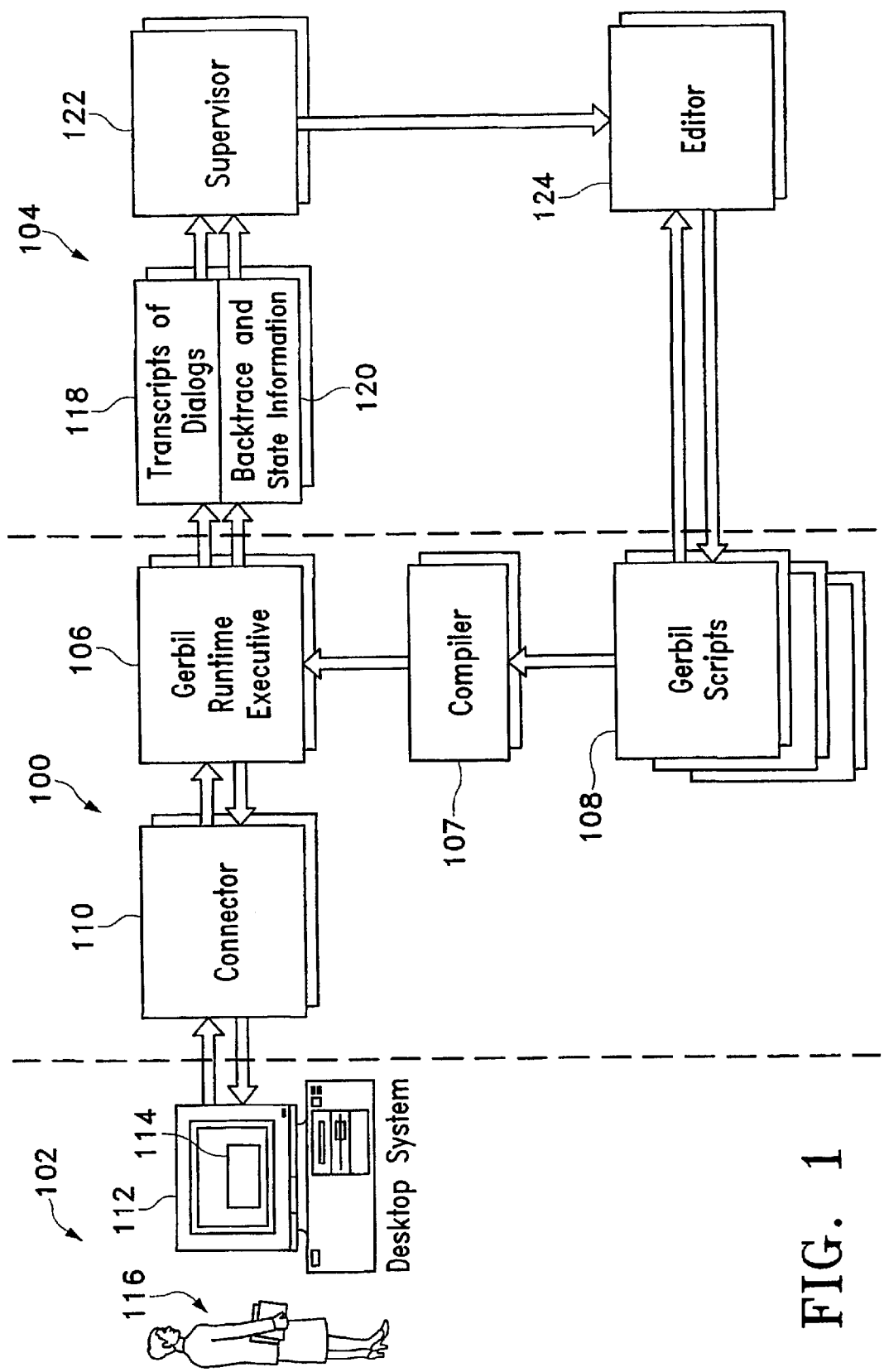
FIG. 1 depicts a suitable operating environment for the purposes of the present invention.

Referring now to FIG. 1, the operating environment of the present invention is depicted. The environment can be characterized generally into three partitions: front end 102; BOT processor 100; and back end 104. Front end 102 is generally the environment in which a human user 116 consults a virtual BOT interface 114 via a computer 112 that may be connected to the BOT processor via a communications link, such as through a server connected to the Internet or alternatively directly connected to BOT processor 100. It will be appreciated that many other means of connection to BOT processor 100 are well known to those skilled in the art and that the present invention should not be limited to the any particular aspects of the general operating environment as disclosed herein.

Typically, human user 116 connects to a site whose interface of first impression is a virtual BOT interface 114. The advantage for the site developer is that human user 116 may have a help or information request that is easily handled via BOT interface 114. Today, it is not uncommon to find sites having a list of FAQs ("Frequently Asked Questions") that serve this purpose of handling very low level user concerns and questions. However, for more advanced questions or interactions with the site, virtual BOTs will become increasing popular.

In the operating environment of this embodiment of the present invention, BOT interface 114 is an instantiation of a process that is spawned by BOT processor 100 via connection 110. BOT processor 100 itself may comprise connection 110; runtime executive process 106, compiler 107, and a set of BOT programs 108. As users 116 log onto a site having BOT processor 100 via connection 110, runtime executive 106 executes an interaction routine that guides the discussion that occurs between user 116 and BOT processor 100. Typically, a two way communications dialogue occurs between user 116 and BOT processor 100 wherein user 116 may ask questions, make declarative statements and other normal communications patterns that humans typify. For the purposes of the present invention, "communications" is to be very broadly interpreted. Indeed, suitable communications could be in the form of written or spoken language, graphics, URL's or the like that may be passed to and from a user to an automatic interface program, such as the present invention.

In turn, runtime executive 106 parses the statements and questions generated by the user and responds according to a set of BOT programs 108. As will be discussed in greater detail, BOT programs 108 are typically created at the back end 104 as a set of "scripts" that the BOT processor will tend to engage in with user 116. For example, if the site using BOT processor 100 is a site for a reseller of personal computers, then BOT processor 100 should be designed to handle questions and discussions concerning personal computers and their peripherals in general. Thus, the back end 104 will generate scripts that will guide the discussion concerning many computer-related topics. These script programs 108 are then compiled by compiler 107 and the compiled code is incorporated into runtime executive 106. As will be discussed below, these scripts are written in an English-like language called "Gerbil™"—the name derived from "General Robot Builder Language"—or alternatively, "NeuroScript™", as developed by the present assignee, Neuromedia, Inc..

As the two-way discussions between user 116 and runtime executive 106 continue, it is generally desirable to engage in quality control of BOT processor 100. This quality control is provided at back end 104 via feedback loop comprising a transcript of dialogues 118 and backtrace and state information 120 of the BOT processor 100; a supervisor 122 and editor 124. As transcripts develop over the course of interacting with a user, the text of these transcripts are stored, together with the state of the runtime executive and backtrace of execution through the runtime executive code. This information forms the basis for accurately diagnosing the runtime executive and for debugging its performance. Such information may be stored electronically in a storage media or could be printed out in human readable form.

Supervisor 122 analyzes the information at 118 and 120 with an eye towards optimizing the performance of the runtime executive. Typically, supervisor 122 could be another human, deciding if the semantics captured by the system needs to be upgraded in response to a dialog transcript that has occurred. If so, supervisor 122 could optionally invoke an editor 124 to edit the Gerbil programs that represent the semantic framework of the runtime executive. These programs would then be re-complied and incorporated into the runtime executive. Supervisor 122 could be a software program (as opposed to another human) that would automatically seek to analyze the performance of the runtime executive and make corrections to the runtime executive through the editing process.

Figure 2:
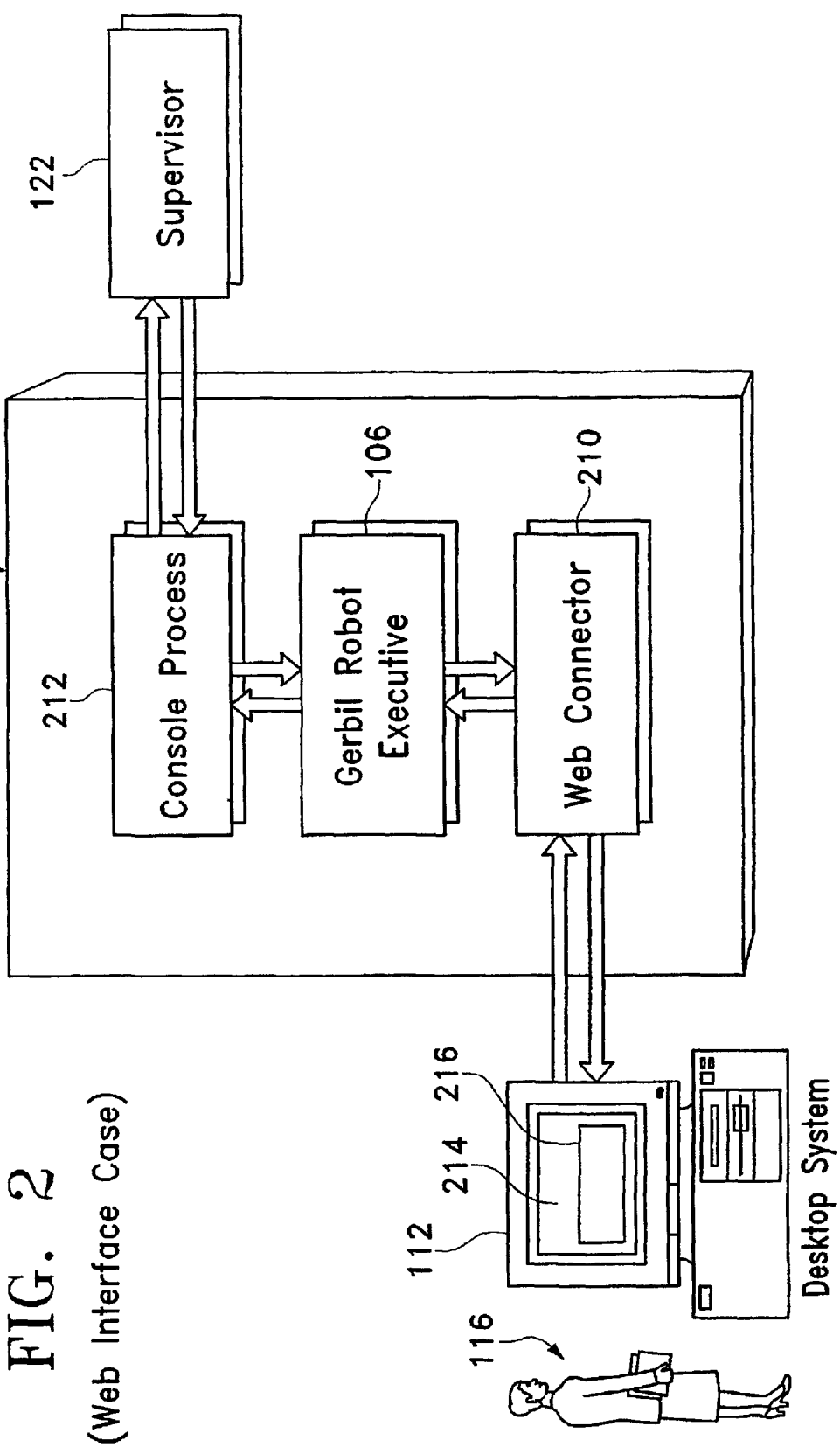
FIG. 2 depicts different operating environments for the purposes of the present invention wherein the connection a user is via an intranet or internet connection.
Figure 3:
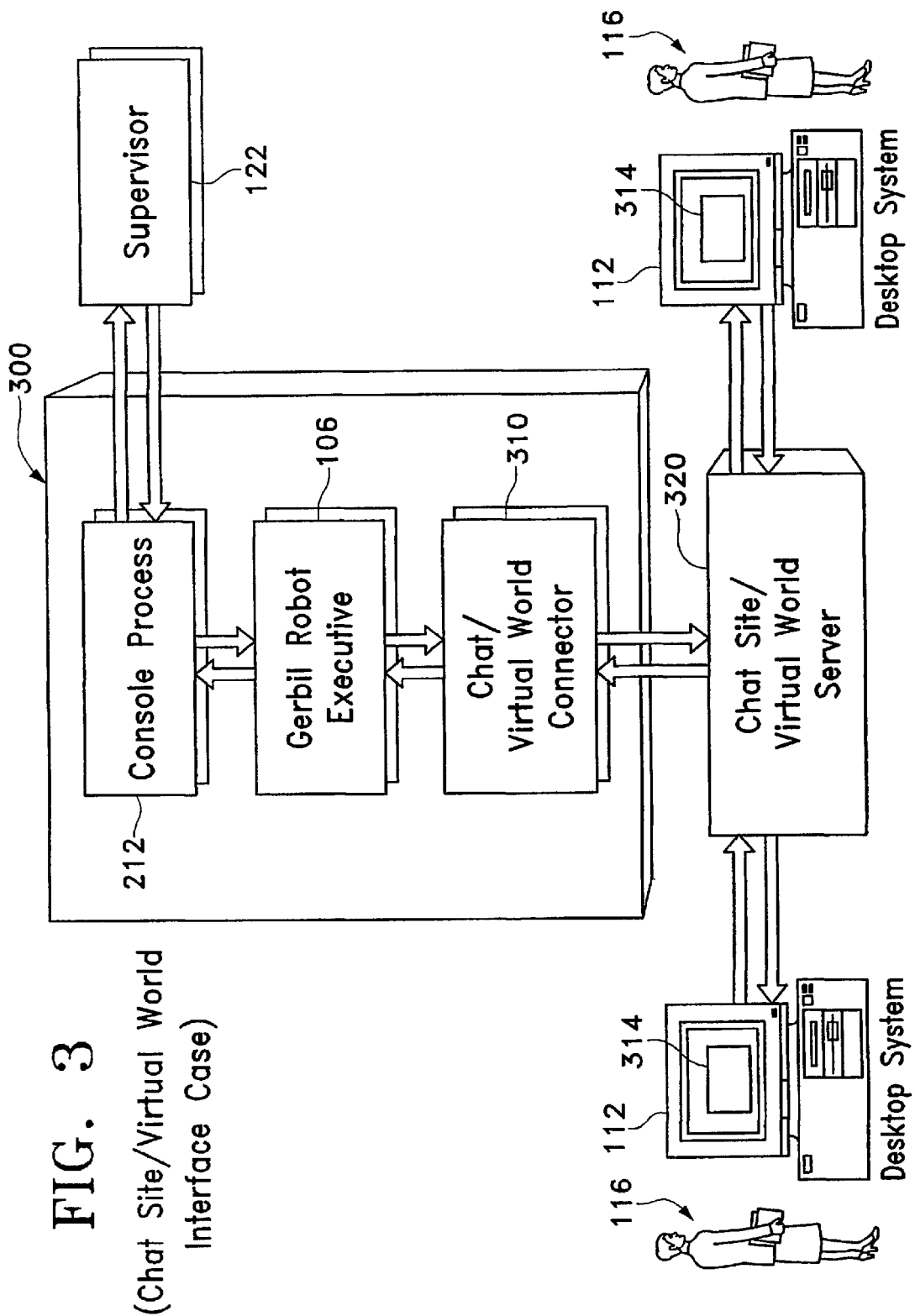
FIG. 3 depicts yet another operating environment wherein the BOT processor is merely a client of another server, such as a chat room or virtual world server.

FIGS. 2 and 3 depict slightly different operating environments for the purposes of the present invention. FIG. 2 depicts a situation wherein the BOT processor 200 connects to user 116 via an intranet or internet connection e.g. web connector 210. For example, web connector 210 may thus spawn a Java applet 216 inside of an HTML page 214 to provide the two-way communications as discussed above. It will be appreciated that such use of Java applets embedded in HTML pages is well known to those skilled in the art. Alternatively, HTML page 214 might communicate directly with web connector 210 via a CGI connection or some other well-known connection protocol. Likewise, the BOT server can accept HTML requests directly. In such cases, persistent state information can be tracked by a "cookie" set in the web browser or similar means.

As is shown, supervisor 122 interfaces with robot executive 106 via console process 212. Console process 212 monitors the execution of robot executive 106 and may do so with a reduced set of monitoring tasks, such as merely checking to see if robot executive 106 is actively running. FIG. 3 depicts a situation wherein the BOT processor 300 is merely a client of another server, such as a chat room or virtual world server, as depicted by server 320. BOT processor 300 is connected to server 320 via a chat/virtual world connector 310 in much the same fashion as any client would connect to a server site. Users 116 that desire to talk or converse with the BOT processor 300 interact through their client connections 314 in much the same fashion as any client-to-client communications that would be effected on server 320.

Although FIGS. 1, 2 and 3 give a general description of various operating environments in which virtual BOTs may exist, it will be appreciated that many other operating environments are obvious to those skilled in the art and that the scope of the present invention should not be so limited to the exemplary descriptions as given above.

II. Bot Processor Description

A. Script Programs and Language

As mentioned above, runtime executive 106 embodies the necessary information to maintain a reasonable conversation with human users to answer their inquiries and to carry on a general discourse with them on a set of topics. These topics are created by the back end in the form of script programs 108 that are compiled (or interpreted) and incorporated into runtime executive 106. In the preferred embodiment of the present invention, script programs may be written by human designers having little or no formal programming experience. It will be appreciated that script programs can also be written by automated learning programs or through partially automated script creation tools, and that the present invention should not be limited to human-written script programs.

Two exemplars of such script programs are given below in Table 1.

TABLE 1

TWO EXAMPLE SCRIPT PROGRAMS

EXAMPLE 1

```
Topic "CatsOrComputers" is
    IfHeard "cat", "computer" then
        IfHeard "cat" then
            Say "What would you like to know about my cat?";
            Focus "Cats";
        Done
        IfHeard "computer" then
            Say "What would you like to know about my computer?";
            Focus "Computers";
        Done
    Done
EndTopic
Topic "Cats" is
    IfHeard "cat", "it" then
        IfHeard "mouse" then
            Say "It caught a mouse once and brought it",
                "to me as a present";
        Done
    Done
EndTopic
Topic "Computers" is
    IfHeard "computer", "it" then
        IfHeard "mouse" then
            Say "The mouse is a PS/2 type mouse with three buttons";
                SwitchTo "Mouse Sales";
        Done
        Continue
EndTopic
Topic "Unknown Input" is
    If?WhatUserSaid DoesNotContain "cat", "computer", "mouse",
        "it" then
        Say "Would you like to know about Cats or Computers?";
    Done
EndTopic
Sequence Topic "Mouse Sales" is
    Always
        Say "Would you like to buy one?";
        WaitForResponse;
        IfHeard "no" Then
        Done
        Say "OK, what is your name?";
        WaitForResponse;
        Remember ?UserName is ?WhatUserSaid;
        Say "That will be $199.95",
            "Please enter your credit card number now";
        WaitForResponse;
        Remember ?CardNum is ?WhatUserSaid;
        Say "OK, We'll mail one to you within two weeks";
            "Please give me your mailing address now.";
        WaitForResponse;
        Remember ?Address is ?WhatUserSaid;
    Done
EndTopic
Priority Topic "Swearing Filter" is
    IfHeard "fudge" Then // a popular swear word . . .
        Say "I'm sorry, that kind of language is not permitted here";
        Do "kick user off system";
    Done
EndTopic
```

EXAMPLE 2

```
Topic "Price of XV17" is
    Subjects "XV17", "cost";
    IfHeard "XV17", "it" Then
        IfHeard "cost", "how much", "what about" Then
            Say "The XV17 monitor is now available for $699";
        Done
        Continue
EndTopic
Topic "Size of XV17" is
    Subjects "XV17", "features";
    IfHeard "XV17", "it" Then
        IfHeard "size", "how big", "what about" Then
            Say "The XV17 monitor has a 17 inch full-color screen";
        Done
```

TABLE 1-continued

TWO EXAMPLE SCRIPT PROGRAMS

```
        Continue
EndTopic
Topic "Maker of XV17" is
    Subjects "XV17", "maker";
    IfHeard "XV17", "it" Then
        IfHeard "who makes", "what about" Then
            Say "The XV17 monitor is made by NEC";
        Done
        Continue
EndTopic
Topic "Price of 5SG" is
    Subjects "5SG", "cost";
    IfHeard "5SG", "it" Then
        IfHeard "cost", "how much", "what about" Then
            Say "The 5SG monitor is now available for $499";
        Done
        Continue
EndTopic
Topic "Size of 5SG" is
    Subjects "5SG", "features";
    IfHeard {5SG", "it" Then
        IfHeard "size", "how big", "what about" Then
            Say "The 5SG monitor has a 14 inch grayscale screen";
        Done
        Continue
EndTopic
Topic "Maker of 5SG" is
    Subjects "5SG", "maker";
    IfHeard "5SG", "it" Then
        IfHeard "who makes", "what about" Then
            Say "The 5SG monitor is made by MonitorTech";
        Done
        Continue
EndTopic
Topic "Price of 6SC" is
    Subjects "6SC", "cost";
    IfHeard "6SC", "it" Then
        IfHeard "cost", "how much", "what about" Then
            Say "The 6SC monitor is now available for $899";
        Done
        Continue
EndTopic
Topic "Size of 6SC" is
    Subjects "6SC", "features";
    IfHeard "6SC", "it" Then
        IfHeard "size", "how big", "what about" Then
            Say "The 6SC monitor has a 19 inch full-color screen";
        Done
        Continue
EndTopic
Topic "Maker of 6SC" is
    Subjects "6SC", "maker";
    IfHeard "6SC", "it"Then
        IfHeard "who makes", "what about" Then
            Say "The 6SC monitor is made by MonitorTech";
        Done
        Continue
EndTopic
```

Considering the two script programs above, several aspects of the scripting language become apparent. First, as designed, the script language uses language primitives that are very close to human natural language. Thus, this scripting language is easy to use by users that have no facility in programming languages per se. TABLE 2 is a BNF (Backus Normal Form) description of the present embodiment of the scripting language:

TABLE 2

BNF DESCRIPTION OF THE SCRIPTING LANGUAGE WITH COMMENTS

```
<Program>= <Statement>
<Statement>= <Definition> | <Category>
```
There are two types of statements in a program: constant definitions and input processing categories. All run-time processing of a user input is handled in the categories.
```
<Definition> = <PatternDef> | <PatternListDef> | <CategoryListDef>|
    <AttributeDef> | <OtherExampleDef>
<PatternDef> = Pattern <symbol>is <string>;
<PatternListDef> = PatternList <symbol>is <patlist>[, <patlist>*];
<CategoryListDef>=<CatListType><symbol>is <string>[, <string>*];
<CatListType> = TopicList | ScenarioList | CategoryList;
<AttributeDef> = Attribute <memref>; |Attribute <memref> specificity
    <integer>;
<OtherExampleDef> =
    OtherExamples of <string> |WhenFocused|
        When [Focused and] <memref>is <patlist>
        [and <memref>is <patlist>]*]
        are <patlist>;
```
Patterns are used to assign a name to a fixed string. The name can then be used in place of the string throughout the program, for readability and ease of modification. Similarly, a PatternList is used to assign a name to a list of strings, and a TopicList, ScenarioList, or CategoryList is used to assign a name to a list of category names (see below.) Attribute declarations are used to declare attributes so that information about them can be displayed through various debugging functions. Declaration of attributes is optional; attributes can be used without being declared. An attribute declaration can also assign a "specificity" value that is used when the attribute is tested using IfRecall or any matching condition. Other Examples declarations define additional arguments for a particular example statement. These additional arguments are tested whenever the original example is tested using the automatic verification mechanism. An OtherExample declaration can also include the keyword WhenFocused to indicate that the arguments are context-sensitive examples, or other When conditions indicating that certain memory attributes should be set to certain values when testing is being done.
```
<Category> = <Topic> | <Scenario>
<Topic> = <CategoryInfo>Topic <string>is <Tstatement>* EndTopic
```

TABLE 2-continued

BNF DESCRIPTION OF THE SCRIPTING LANGUAGE WITH COMMENTS

<Scenario> = <CategoryInfo>Scenario <string>is <Sstatement>*
    EndScenario
   <CategoryInfo> = [Suppressed] [Priority | Default | Sequence]
A category is either a topic or a scenario. A topic is used to process user
statements, while a scenario is used to process user actions. The term "category" is used
to generically refer to a topic or scenario.
Categories are divided into four types, priority, standard, default, and sequence,
according to the label preceding the word "topic" or "scenario". A category that is not
labeled is a Standard type. When the user makes a statement or takes an action, the
categories in the program are executed, until a Done is reached (see below.) All priority
categories are executed first, in the order in which they appear in the program. Next, all
standard categories are executed. The order in which standard categories are executed
changes dynamically depending on the execution of the program, and is described in the
next paragraph. Finally, all default categories are executed, in the order in which they
appear in the program. Sequence categories are executed only when explicitly accessed
in a SwitchTo statement.
Standard categories are executed according to a "best-fit" matching mechanism,
in which ties are broken according to an ordered list that initially corresponds to the order
in which they appear in the program. When a standard category is executed, it, and other
categories that share at least one Subject, is moved to the front of the standard category
list (and so will be executed first on the next input.) The order of the standard category
list can also be changed by commands within the program, as described below.
Categories can also be temporarily suppressed, in which case they are not
executed at all. If the keyword Suppressed appears in front of the category definition, it
is initially suppressed. Category suppression is discussed further below.
   <Tstatement> = <MemoryLock> | <SubjectList> | <Tconditional>
   <Sstatement> = <MemoryLock> | <SubjectList> | <Sconditional>
   <Tconditional> = <Condition> | <Command> | <Tconditional>)*
    <TconditionalEnd> |
    <Tconditional> Otherwise < Tconditional>
   <Sconditional> = <Condition> | <Command> | <Sconditional>)*
    <SconditionalEnd> |
    <Sconditional> Otherwise < Sconditional>
   <TconditionalEnd> = Done | Continue | NextTopic | TryAgain | SwitchBack
   <SconditionalEnd> = Done | Continue | NextScenario | TryAgain |
SwitchBack
The body of each category is a list of conditional blocks. These conditional
blocks are executed in the order found in the category. If the condition of a conditional
block is false, execution goes on to the next conditional block in the category, or to the
next category if there are no further conditional blocks. If the condition is true, the
commands and conditional blocks inside the block are executed, and further behavior of
the program is dependent on the keyword which ends the conditional block. If it ends
with Done, execution ceases until the next input occurs (unless an InterruptSequence has
been executed; see below.) If it ends with Continue, execution continues with the next
conditional block in the category, or the next category if there are no further conditional
blocks. If it ends with NextTopic/NextScenario, the rest of the current category is
skipped and execution continues with the next category. If it ends with TryAgain, the
most recent WaitForResponse within the block is executed (it is an error to end a block
with TryAgain if it does not contain a WaitForResponse.) If it ends with SwitchBack,
execution resumes immediately following whichever SwitchTo statement switched to the
current block. It is an error to end a block with SwitchBack if the block is not inside a
Sequence topic.
Conditional blocks can be combined using the Otherwise keyword; if the first
condition is true then the condition block(s) that follow the Otherwise keyword are not
executed. This behavior is similar to the behavior of an "else" command in C and similar
programming languages.
   <MemoryLock> = MemoryLock <memref>[, <memref>]*;
The top level of a category may contain one or more MemoryLock statements.
Each MemoryLock statement asserts that the value of one or more associative memory
elements should only be changed within that category. If an associative memory key ?x
is MemoryLocked in a category C, it is an error for a program to assign a value to ?x
using Remember or Forget anywhere outside the category C, or to MemoryLock ?x in
some other category.
   <SubjectList> = Subjects <string> [, <string>]*;
The top level of a category may contain one or more Subjects statements. Each
asserts that the given subjects are subjects of the topic. If a non-IF command within the
body of the topic is executed, all topics which share at least one Subject with the topic are
brought to the front of the focus of attention.
   <Condition> = <SingleCondition> Then
   |  <SingleCondition> [ and <SinlgleCondition>]* Then
   |  <SingleCondition> [or <SingleCondition>] * Then
   |  If <ConditionClause> [ and <ConditionClause>] * Then
   |  If <ConditionClause>[ or <ConditionClause>] * Then
   |  IfChance Then
   |  Always
A condition can either be a basic condition (described below) or a Boolean
combination of basic conditions. A Boolean combination of basic conditions that

TABLE 2-continued

BNF DESCRIPTION OF THE SCRIPTING LANGUAGE WITH COMMENTS includes both and and or keywords must use parentheses to prevent possible ambiguity; there is no built-in operator precedence between and and or in GeRBiL. The Boolean not operator is implemented within the basic conditions; there is no explicit not keyword that applies to conditions. Finally, there are two basic conditions that cannot be combined using Boolean operators. The IfChance condition with no numeric argument is a probabilistic condition that has the same likelihood of being true as all the other argument-less IfChance statements immediately before or after it. Finally, the Always condition is simply always true.

```
<ConditionClause> = <MatchLHS> <PosMatchKeyword>
                    <MatchingList>
|<MatchLHS> <NegMatchKeyword> <PosMatchingList>
|Heard <MatchingList>
|NotHeard <PosMatchingList>
|Recall <MemList>
|DontRecall <PosMemList>
|Chance <chance>
|Focused
|(<ConditionClause> [and <ConditionClause>]*)
|(<ConditionClause>or <ConditionClause>]*)
|{<ConditionClause> [and <ConditionClause>]*}
|{<ConditionClause> [or <ConditionClause>]*}
<MatchLHS> = <string> |<memref> | <starbufref>
<PosMatchKeyword> = Contains | Matches |
ExactlyMatches
<NegMatchKeyword> = DoesNotContain | DoesNotMatch |
DoesNotExactlyMatch
```

There are four basic types of condition clause. First, conditions using the match keywords match a particular input pattern, most normally an element of the user memory, such as the string said by the user, to some set of template patterns, which may contain various "macro" characters, such as wildcard characters. Negated matching keywords, such as DoesNotContain, are given their own special category, in order to prevent "double negative" conditions. The Heard and NotHeard keywords are shortcuts equivalent to the commonly used condition "? WhatUserMeant Contains". Second, Recall and DontRecall are used to test whether elements df the user memory have been set or not, and are most commonly used in practice for testing flags that are set by libraries, for instance to indicate the type of question or statement that is being processed. Third, Chance conditions are true or false at random with the given probability. Fourth, Focused conditions are true if the category in which it is found contains one or more subjects in common with a category that was activated by the most recent input that activated at least one subject. Condition clauses can also be combined using and and or as long as parentheses are used to prevent ambiguity. The curly bracket symbols {} can be used to indicate that a condition is optional.

```
<SingleCondition> = IfHeard <MatchingList> |
        IfNotHeard <PosMatchingList> |
        IfRecall <MemList>
        IfDontRecall <PosMemList>
        IfChance <chance>
```

The single condition objects are equivalent in meaning to the analogous condition objects, except that the If keyword is combined with the condition keyword. In the present implementation, there are also certain cases where single condition objects can be substituted for condition clause objects.

```
<MatchingList> = <MatchingListArg> [[and|&]
            <MatchingListArg>]*
|<MatchingListArg> [[and|& ] <MatchingListArg>]*
            [[and|&] not <MatchingListArg>]*
|<MatchingListArg>[[or|,] <MatchingListArg>]*
<MatchingListArg> = <patlistobj> | (<MatchingList>)
<PosMatchingList> = <PosMatchingListArg> [[and|&]
            <PosMatchingListArg>]*
            |<PosMatchingListArg>[[and|&]
            PosMatchingListArg>]* [[and|&]not
            |<PosMatchingListArg>]*
            |<PosMatchingListArg>[[or|,]
            <PosMatchingListArg>]*
<PosMatchingListArg> = <patlistobj> |
            (<PosMatchingList>)
```

A matching list is a list of pattern list objects (single expressions evaluating to lists of strings; see below) separated by and, and not, or or. (The keyword and and the ampersand character (&) are interchangeable, as are the keyword or and the comma.) A matching list serves as the right-hand-side of a matching expression. Parentheses must be used to prevent ambiguity any time a memory reference list contains both and and or. Finally, a positive-only matching list does not allow the use of and not, in order to prevent double negatives such as "DoesNotContain X and not Y".

```
<MemList> = <MemListArg> [[and|&] <MemListArg>]*
    |<MemListArg> [[and|&] <MemListArg>]* [[and|&] not MemListArg>]*
    |<MemListArg> [[or|,] <MemListArg>]*
<MemListArg> = <memref> | (<MemList>)
```

TABLE 2-continued

BNF DESCRIPTION OF THE SCRIPTING LANGUAGE WITH COMMENTS

```
    <PosMemList> = <PosMemListArg> [[and|&] <PosMemListArg>]*
        | <PosMemListArg> [[or|,] <PosMemListArg>]*
    <PosMemListArg> = <memret> | (<PosMemList>)
```
A memory reference list is a list of one or more memory references separated by
and, and not, or or. (The keyword and and the ampersand character (&) are
interchangeable, as are the keyword or and the comma.) Parentheses must be used to
prevent ambiguity any time a memory reference list contains both and and or. Finally, a
positive-only memory reference list does not allow the use of and not, in order to prevent
double negatives such as "DoesNotContain ?X and not ?Y"
```
    <Command> = Say <patlist>; | SayOneOf<patlist>; |
        Do <patlist>; | DoOneOf<patlist>; |
        Show <patlist> [in <patlist>]; |
        ShowTemplate <patlist> [in <patlist>]; |
        ShowLocalFile <patlist> [in <patlist>]; |
        SayToConsole <patlist>; | SayToFile <pat> <patlist>; |
        Trace <patlist>; | Expires <string>; |
        Focus <catlist>; | Focus Subjects <string> [, <string>]*; |
        DontFocus; | Suppress <catlist>; | Recover <catlist>; |
        Forget <memlist>; | ForgetOneOf <memlist>; |
        Remember <memlist>; | RememberOneOf<memlist>; |
        Remember <memref> is <patlist>; |
        Remember <memref> IsOneOf <patlist>; |
        Remember <memref> is Compute <FunctionName> of
        <patlist>; |
        Remember <memref> is Compute ListItem <string> of
        <patlist>; |
        WaitForResponse; | InterruptSequence;
        SwitchTo <string>; | SwitchTo <symbol>; |
        SwitchToOneOf <catlist>; |
        Example <patlist>; |
        InitialExample <integer> <patlist>; |
        WhenFocused Example <patlist>; |
        When [Focused and] <memref> is <patlist>
        [and <memref> is <patlist>]*
        Example <patlist>; |
        SequenceExample <exampleindex> <patlist>; |
        LoginAs <pat> Password <pat>; |
        ChangeAccountName <pat> ForAccount <pat>
        WithPassword <pat>; |
        ChangeAccountPassword <pat> ForAccount <pat>
        WithPassword <pat>; |
        ChangeAccountEmail <pat> ForAccount <pat>
        WithPassword <pat>; |
        RetrieveAccountInfo <pat>; |
        LoginAs <pat> WithPassword <pat>; |
        DestroyUserAccount <pat> WithPassword <pat>; |
        CreateUserAccount <pat> WithPassword <pat>
        [WithEmail <pat>]; |
        CreateThisUserAccount <pat> WithPassword <pat>
        [WithEmail <pat>];
        DisconnectThisUser;
    <FunctionName> = SpellCheck | URLEncoding | Capitalize |
        UpperCase | LowerCase | Sum | Difference | Product
        Ratio | Comparison | ListSize | ListTail
```
The basic commands in Gerbil are shown above. Say makes a statement to the
user, while Do takes an action of some sort. (The possible arguments of a Do action are
domain-specific.) SayOneOf and DoOneOf nondeterministically select one of their
arguments, and Say or Do that argument. Show, ShowTemplate, and ShowLocalFile
show content in an HTML display frame. SayToConsole is a Say statement whose
output is directed to the console window and log file. SayToFile is a Say statement
whose output is directed to a text file. Trace is a Say statement whose output is directed
to the console window and log fil e, and only appears when the script is being run in
various debugging modes. Expires is a non-executable statement that produces a warning
when compiled after a certain date. Remember is used to assign values to associative
memory elements; if a list of arguments is given with no is keyword, each argument is
assigned an arbitrary non-empty value (currently the string "TRUE".) Remember can
also be used to compute a function and assign its value to a memory element; currently
implemented functions include spell-checking, URL encoding, math, string capitalization
operations, and list operations. Forget is used to un-assign values of associative memory
elements. Once Forget ?x has been executed for some element ?x, ?x will have no value
and will not cause an IFRecall statement to become true, until a Remember statement is
executed for ?x. ForgetOneOf RememberOneOf and Remember . . . IsOneOf are the
nondeterministic equivalents of Forget, Remember, and Remember . . . Is, respectively.
Suppress takes a list of categories as arguments and suppresses each of its argument
categories so that they are no longer executed on any input. Recover takes a list of
categories as arguments and reverses the effect of a Suppress command. Focus takes a list
of categories as arguments and places them at the front of the ordered category list.

TABLE 2-continued

BNF DESCRIPTION OF THE SCRIPTING LANGUAGE WITH COMMENTS

Focus Subjects takes a list of subjects as arguments and places all categories which cover at least one of those subjects (as defined with a Subjects command in the top level of the category) at the front of the ordered category list. WaitForResponse halts execution in the same way as a Done statement but resumes at the same point on the next input. InterruptSequence can only be used within a Sequence topic, and temporarily halts execution of the current topic while all of the standard and default topics are executed. When a Done is reached, or when all of the standard and default topics are completed, execution resumes, without waiting for further input, within the Sequence topic. A SwitchTo command immediately transfers control of execution to the named category. A SwitchToOneOf command chooses one of its arguments at random and executes a SwitchTo on it. The various Example statements do not have any immediate effect, but are used in automatic verification. LoginAs, ChangeAccountName, ChangeAccountPassword, ChangeAccountEmail, RetrieveAccountlnfo, LoginAs, DestroyUserAccount, CreateUserAccount, and CreateThisUserAccount are commands used in handling named user accounts that can be accessed by end users only through a password. DisconnectThisUser is a command used to terminate an interaction with a user and clear the user record from the BOT's memory.

<pat> = <string> | <symbol> | <memref> |
    starbufref> | <pat> + <pat>

A pattern is anything that evaluates to a string. It can be an explicit string (indicated with quotes), the name of a Pattern object, an associative memory reference, a reference to a "star buffer element" (set according to wildcard characters appearing in template patterns within pattern matching conditional statements), or a concatenation of any of the above.

<patlistobj> = <pat> | <symbol> | (<patlist>) |
    {<patlist>} | <patlistobj> + <patlistobj>

A patternlist object is any single expression that evaluates to a list of zero or more strings. It can be a single pattern, the name of a PatternList object, a PatternList enclosed in parentheses (also known as an "implicitly defined PatternList" since it is never explicitly given a name), a PatternList enclosed in curly brackets (indicating that the element or elements included within the brackets are "optional"), or a concatenation of any of the above. The value of the concatenation of two lists of strings is a list consisting of the concatenation of each element in the first list with each element of the second list. If one of the lists is empty (i.e. contains no strings), the concatenation is the value of the other list. A symbol is a string of alphanumeric or underscore characters, beginning with a letter. Symbols are not case sensitive.

<patlist> = <patlistobj> |, <patlistobj>]*

A pattern list is anything that evaluates to a list of strings. It consists of one or more PatternList objects, separated by strings. Since each PatternList object may have a value that is a list of strings, the value of the PatternList is the value of all the elements appended together.

<catlist> = <catname> ], <catname>]*
    <catname> = <string> | This | <symbol>

A category reference is either an explicit string containing the name of a category, the keyword This (referring to the category in which it appears) or the name of a CategoryList (or TopicList or ScenarioList) object. A category list is simply a list of categories or CategoryList objects separated by commas.

<memref> = ?<symbol> | ?<pat>:<symbol>
    <memlist> = <memref> [, <memref>]*

A reference to the associative memory is normally indicated by a ? followed by the name of the key. Such references are normally particular to the user whose input is being processed. A reference to the associative memory for another user can be made by putting a pattern referring to the other user between the ? and the key. The reference to the other user is separated from the key by a colon. A memory reference list is simply a list of memory references separated by commas.

<starbufref> = #<integer> | *<integer> |
    %<integer> | ^<integer> | *match The "star buffer" contains the substring of an input string which matched each *, #, %, or ^wildcard character in the template pattern in the most recent successful match. References to this star buffer consist of a symbol (*, #, ^, or %) followed by a number. *n refers to the substring which matched the Nth * wildcard character found in the template, and so on. *match refers to the substring of the input string that matched the entire template pattern.

<chance> = <realnumber> | <realnumber>%

The argument of a Chance statement is either a real number between 0 and 1, interpreted as a probability, or a real number between 0 and 100 followed by a % sign, interpreted as a probability multiplied by 100.

<exampleindex> = <integer>[.<symbol>]*

The index for a SequenceExample statement is an integer followed by zero or more strings of alphanumeric characters, separated by periods.

The second aspect of the example script programs is that the scripts themselves embody a particular universe of discourse reflective of the subject matter concerning the site itself—e.g. a BOT for a site of a reseller of personal computer should "know" something about computers and their peripherals. These script programs are written in an action-response type style wherein the actual language supplied by the user embodies an "action" to which the "response" is written into the script program itself.

Scripts in the present embodiment are written generally by site administrators (human or otherwise) by defining a list of "categories" in which the site will be well conversant. Categories may comprise "topics" that are recognizable by the runtime executive. Topics, in turn, may comprise patterns or words that are matched against the stream of input communication (in either spoken or written or any other suitable form of communication) from the user.

To embody this knowledge into the runtime executive itself, the script programs are compiled by compiler 107 in FIG. 1. As previously mentioned, these script programs may be iteratively changed to improve the interaction with human users by a re-edit and re-compile process. It will be appreciated that compiler techniques sufficient to implement the above-listed BNF language description are well known to those skilled in the art and that the present invention should not be limited to any particular compiler techniques.

B. Runtime Executive Process

Figure 4:
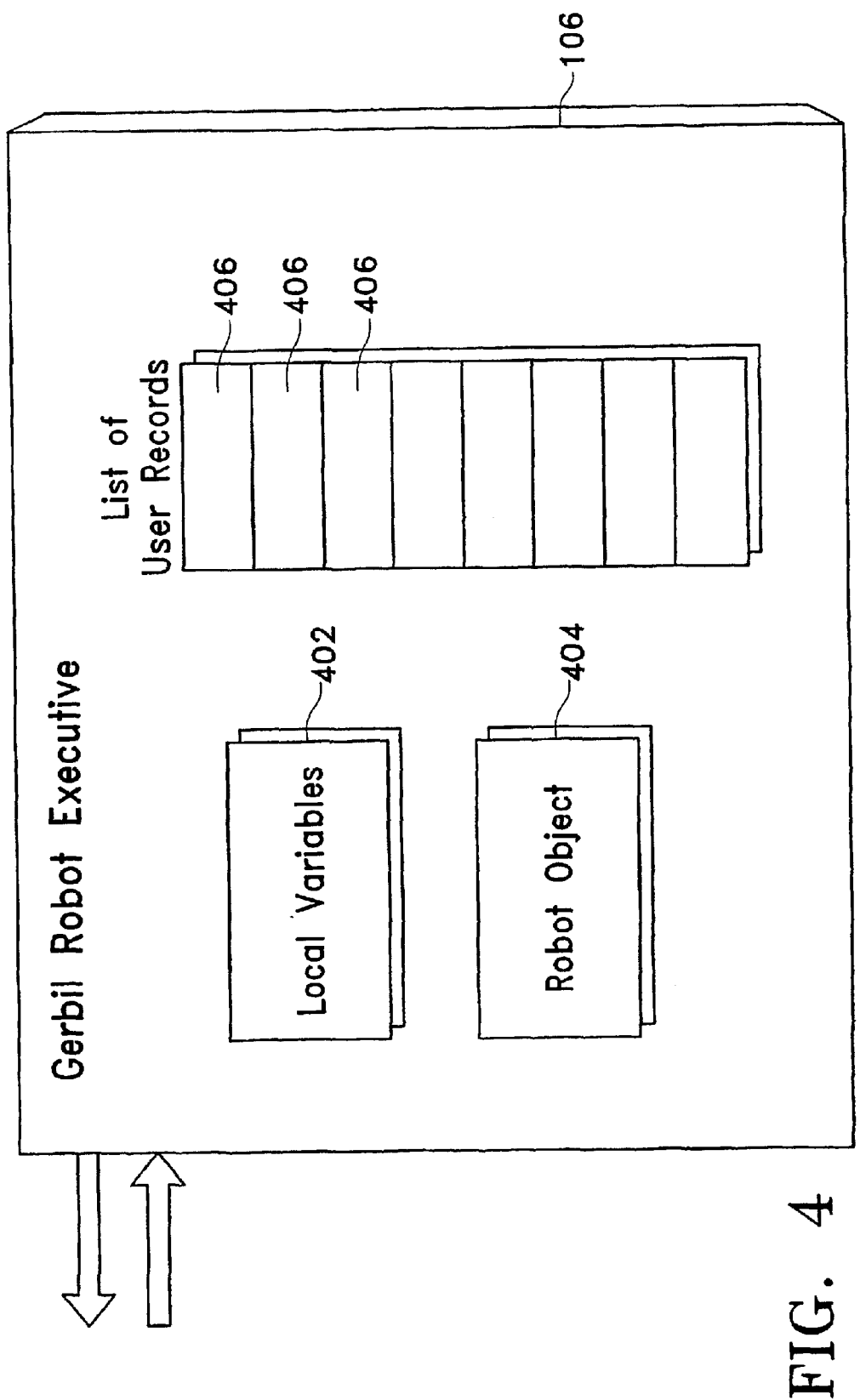
FIG. 4 expands the view of one embodiment of the runtime executive.

FIG. 4 expands the view of runtime executive 106 of FIG. 1. Runtime executive 106 comprises local variables 402, robot object 404, and a list of user records 406. Robot object 404 is that part of runtime executive 106 that is incorporated by the compilation process described above. Although robot object 404 may be changed via the re-edit and re-compilation process as mentioned, during runtime, robot object 404 typically does not change whilst in conversation with user 116. The list of user records 406 is provided because the BOT processor could be in conversation with multiple users simultaneously and therefore needs to maintain the state of each on-going conversation. The state for each such conversation is maintained in a user record 406. Finally, runtime executive 106 maintains local variables 402 that are used during the processing of a single user input.

TABLE 3 is a listing of the C++ header file that embodies runtime executive 106.

TABLE 3

C++ HEADER FILE OF RUNTIME EXECUTIVE

```
class CProgram
{
public:
    CExeStruct*             ProgramExecutable;
    CMatcher*               Matcher;
    CBFMatcher*             BFMatcher;
    // holds all short-term run-time data
    CRunStruct*             RunTime;
    CGRBLToolDoc*           OwnerSession;
    CString                 CurrentInputString;
    // Registered attributes
    CTypedPtrMap<CMapStringToPtr, CString, CAttributeInfo*>
                            *m_pmspAttributeRegistry;
    // Subject information
    CTypedPtrMap<CMapStringToPtr, CString, CSubjectInfo*>
                            *m_pmspSubjectInfo;
    // A map of all the attributes defined in the program,
    // either automatically or through a Remember cornrnand,
    // without initial ? values. The pointers here are all NULL.
    CMapStringToPtr         m_pmsnDefinedAttributes;
    // Compile status
    BOOL                    m_bServerVersion;
```

TABLE 3-continued

C++ HEADER FILE OF RUNTIME EXECUTIVE

```
// Run-time options
BOOL                    TraceOn;
BOOL                    FullTraceOn;
BOOL                    EchoOn;
CategoryExecutionMode   ExecutionMode;
// Shortcut to the test user
CUserRec*               TestUser;
// TestMode TRUE indicates that user state is saved in order to go
// back and retreive further categories that were activated by an
// execution. (This also happens if ExecutionMode is EqualMatches
// or AllMatches.)
// Used for Example mode and other debugging modes.
BOOL                    TestMode;
BOOL                    BEST_FIT_DEBUG;
// whether it says anything when example answer is right
BOOL                    CorrectExampleTrace;
// so we dont try to send out to clients.
BOOL                    ReplayingLog;
// in order to have output and report messages echoed to a report file,
// set Reporting to TRUE and set m_strReportFileName.
BOOL                    Reporting;
CString                 m_strReportFileName;
// Values for keeping statistics during Example testing
int                     nExamplesRun;
// correct answer not given, maybe others given
int                     nWrongAnswers;
int                     nExtraAnswers;
// Run is bound to a particular session doc and view, and executes
// either Topics or Scenarios. IfTestMode is on, produces no
// direct output.
void Run(             CGRBLToolDoc*    ThisDoc,
    LPCTSTR           TextLine,
    LPCTSTR           UserName,
    ULON              UserID,
                      ULONG            ProtocolMessageType,
                      LONG             nLINE_ID = 1);
// Runs all examples in a file or program.
void RunAllExamples(  CGRBLToolDoc*    Context,
                      BOOL             bTestAllFiles,
                      CstringList&     lFileNames,
                      LPCTSTR          ReportFileName,
                      BOOL             bEchoOn,
                      BOOL             bPrintAll);
void RunSequenceExample(CSequenceExample*  ThisExample,
                      CUserRec*        purExampleUser,
                      CUserRec*        purExampleState,
                      CGRBLToolDoc*    Context);
void RunExampleSet(   CExample*        ThisExample,
                      CUserRec*        ExampleUser,
                      CUserRec*        ExampleState,
                      BOOL             bNeedFullState,
                      CGRBLToolDoc*    Context);
void RunExampleInput( LPCTSTR ExampleText,
                      CExample*        ThisExample,
                      CUserRec*        ExampleUser,
                      CGRBLToolDoc*    Context);
// Runs initial examples only; no feedback. For condition testing.
void RunInitialExamples(CGRBLToolDoc*  Context);
// Functions to summarize all the examples in the bot
void SummarizeExamples( BOOL          bShowOtherExamples,
                      BOOL             bUseAllFiles,
                      CStringList&     slFileNames,
                      LPCTSTR          ReportFile);
void SummarizeExample(CExample*        ThisExample,
                      FILE*            f,
                      BOOL             bShowOtherExamples);
// Runs an attribute check
void RunAttributeCheck(LPCTSTR InputText);
// Performs "intelligent find-in-files"
void LookForCategories(LPCTSTR InputList,
                      int NumCategories,
                      int Flags);
CSearchPattern*ConvertPatternToSearchPattern(CString Pattern,
                      BOOL Subword);
```

TABLE 3-continued

C++ HEADER FILE OF RUNTIME EXECUTIVE

```
// function which fetches the next category to be executed
CCategory* GetNextCategory(CGRBLToolDoc* Context,
                CUserRec* ThisUser,
                CCatType ExecutionType,
                CABlockEnd LastReturnVal);
// Output interface between the Bot and the Connector. This now
// outputs only to the robot, not to the console. The output message,
// annotated with "Robot says", etc., are put in
// RunTime->RobotOutputSummary
void RobotOutput(LPCTSTR TextLine,
                ULONG    ThisUserID,
                ULONG    MsgType);
// Wrapper which uses the RunTime SayBuffer if needed
void BufferedSay(LPCTSTR TextLine,
                ULONG    ThisUserID,
                ULONG    MsgType,
                BOOL IsBuffered,
                CArgListElem* ItemSaid);
// produces appropriate trace messages for example mode.
void HandleOutputInExampleMode(CAction* Action,
                CObjFile* SrcFile,
                Int SrcLine);
// Output a line to the console. ALL output or potential output to
// the console and/or log or report files should go through this fuction.
void ConsoleOutput(OutputLineType MessageType,
                LPCTSTR Message,
                LPCTSTR SourceFile,
                int SourceLine);
void ConsoleOutput(OutputLineType MessageType,
                LPCTSTR Message);
void ConsoleOutput(OutputLineType MessageType,
                CConsoleData* MessageData);
void PushConsoleOutput(ConsoleOutputType OutputType);
void ClearConsoleOutput();
void PushConsoleOutputToString(ConsoleOutputType OutputType,
                CString&    OutputString);
// version which bypasses all buffers and just prints it out.
void DirectConsoleOutput(OutputLineType MessageType,
                LPCTSTR Message,
                LPCTSTR SourceFile,
                int SourceLine);
void DirectConsoleOutput(OutputLineType MessageType,
                LPCTSTR Message);
void DirectConsoleOutput(OutputLineType MessageType,
                ConsoleData* MessageData);
// Reset user to initial state (of memory and attention stack)
void RestartUser(CUserRec* ThisUser);
// reset the name
// BOOL ChangeUserName(ULoNG UserID, LPCTSTR NewName);
// Special functions are declared here.
void DumpMemory(ULONG    ID);
void PrintCurrentFocus(CUserRec* User,
                BOOL ShowAll,
                int NumCategories);
void PrintReplacements(CUserRec* User);
// Print statistics about category usage
void ReportCategoryStats(LPCTSTR FileName);
// Prime the random number generator for this thread
void PrimeTheRNG();
// Handle the refocusing component of the program execution
void Refocus();
// Focus on a single category
void FocusCategory(CCategory* ThisCategory);
// Continuation help functions
void SetupContinuation(CGRBLToolDoc* Context,
                CUserRec* ThisUser,
                CContinuation* ThisContinuation);
// Functions to Remember and Forget automatically-defined
// attributes for the current user.
void SetUserAttribute(LPCTSTR Key, LPCTSTR Value);
void UnsetUserAttribute(LPCTSTR Key);
// Automatic pronoun replacement
BOOL ReplacePronouns(CString OriginalText, CString & FinalText);
// Intelligent Tracing Functions
void AddConditionTraceData(LPCTSTR Message,
                LPCTSTR SrcFileName,
                int SrcLine);
void EnterIfFrame();
void EnterSwitchFrame(LPCTSTR Message,
                LPCTSTR SrcFileName,
                int SrcLine);
void ExitIfFrame();
void ExitSwitchFrame(LPCTSTR Message,
                LPCTSTR SrcFileName,
                int SrcLine);
void ExitAllFrames();
void AddTraceMsg(LPCTSTR Message,
                LPCTSTR SrcFileName,
                int SrcLine,
                BOOL FullTraceOnly);
void ActivateTrace(); // equivalent to a null trace message
void ActivateExampleTrace(); // version for Examples mode
void ReplayTrace(BOOL FullTrace);
// Authoring functions not used at run-time, and involving
// the test user
BOOL AuthorTestCondition(CCondition* pCondition,
                LPCTSTR    szInputText,
                BOOL       bFocused,
                CCategory* pConditionCategory);
// computes the most specific attribute-pattern pair for the current
// memory state of the test user.
void AuthorGetBestPattern( CString&    strAttribute,
                CString& strValue);
// Functions for finding things
CItemSourceData* GetListLocation(LPCTSTR SymbolName);
CItemSourceData* GetSequenceLocation(LPCTSTR SymbolName);
CCategory* GetCategoryByName(LPCTSTR StringName);
CItemSourceData* GetOtherExampleLocation(LPCTSTR
StringName);
CProgram(CGRBLToolDoc* pgtd);
~CProgram();
};
```

Figure 5:
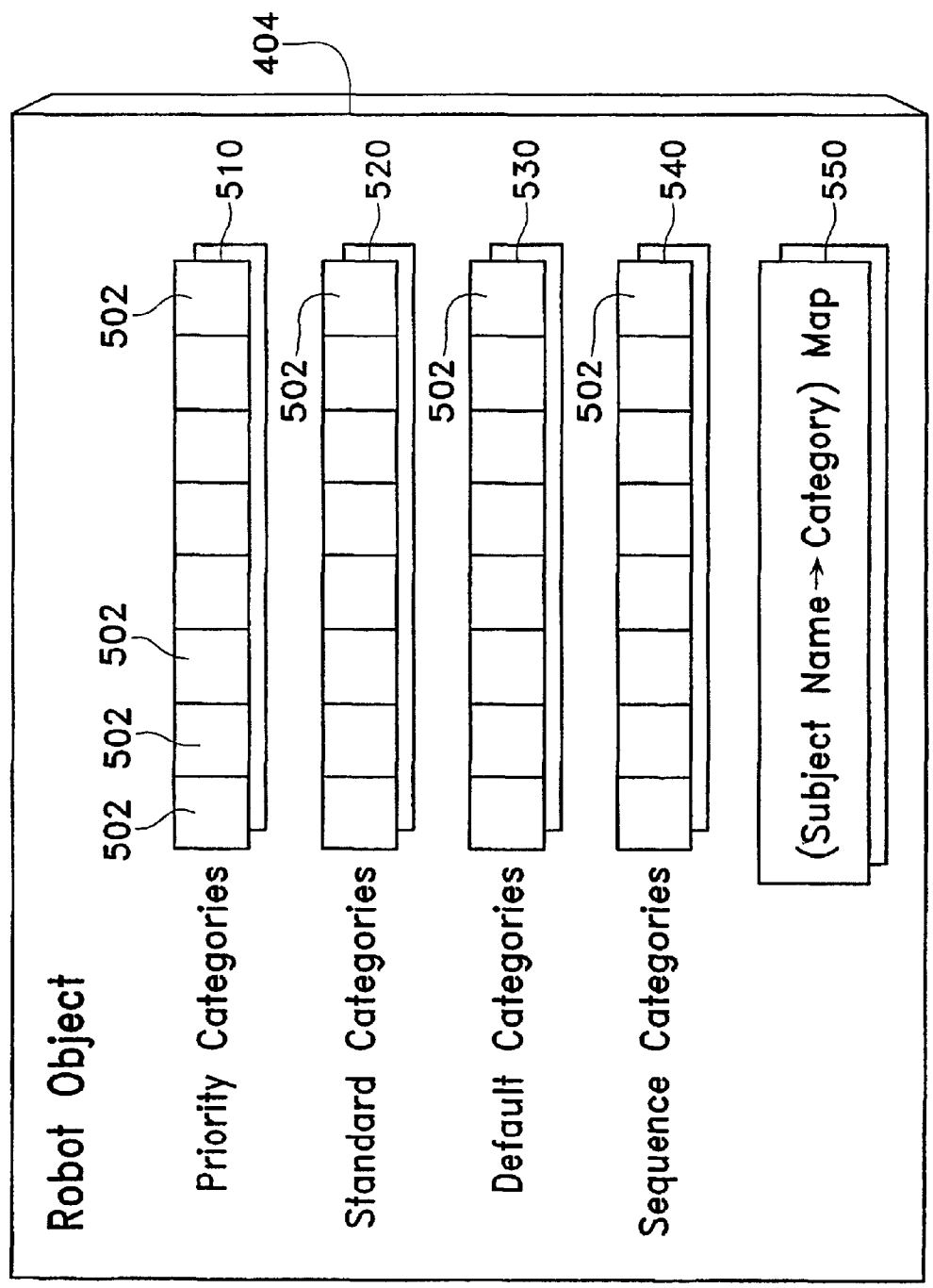
FIG. 5 expands the view of an embodiment of a robot object.

In the code given in Table 3, robot object 404 corresponds to ProgramExecutable, which is of type CExeStruct. FIG. 5 expands the view of robot object 404 as shown in FIG. 4. Robot object 404 comprises several types of categories. These categories inherently maintain a priority by which runtime executive 106 processes inputs. For example, in FIG. 5, four types of categories are depicted: priority categories 510, standard categories 520, default categories 530, and sequence categories 540. When an input comes into the BOT processor, the input is processed through a series of categories. First, the priority categories are processed to determine whether there is a response that will be generated by the current input. These priority categories are processed, in the present embodiment, in the order in which they appear in the runtime executive. This order is currently selected in turn by the actual order in which PRIORITY TOPICS are found in the script program. This processing continues through the standard and default categories. Standard categories are executed according to a best-fit matching mechanism that selects the category that best matches the input from among those categories, if any, that match the input. Default categories are executed in the actual order in which DEFAULT TOPICS are found in the script program. Sequence categories 540 are also included in the robot object 404 but are not executed unless explicitly executed by a SWITCH-TO statement as described below. In the present embodiment, sequence categories are typically employed to perform a number of pre-defined sequential communications with a user to effect a desired result. For example, having the BOT take an order for tickets to an event, how many such tickets, credit card information to purchase such tickets, etc. is readily implemented as a sequence category. Such a sequence category would be SWITCHed-TO if prompted by a user inquiry to buy tickets. It will be appreciated that other hierarchies of categories may be defined and order of execution selected.

FIG. 5 also contains subject-name to category map 550, which describes the categories associated with each subject found in a SUBJECTS command in one or more categories. This map helps to implement the Focus Subjects command and automatic focus mechanisms, as described below.

Figure 6:
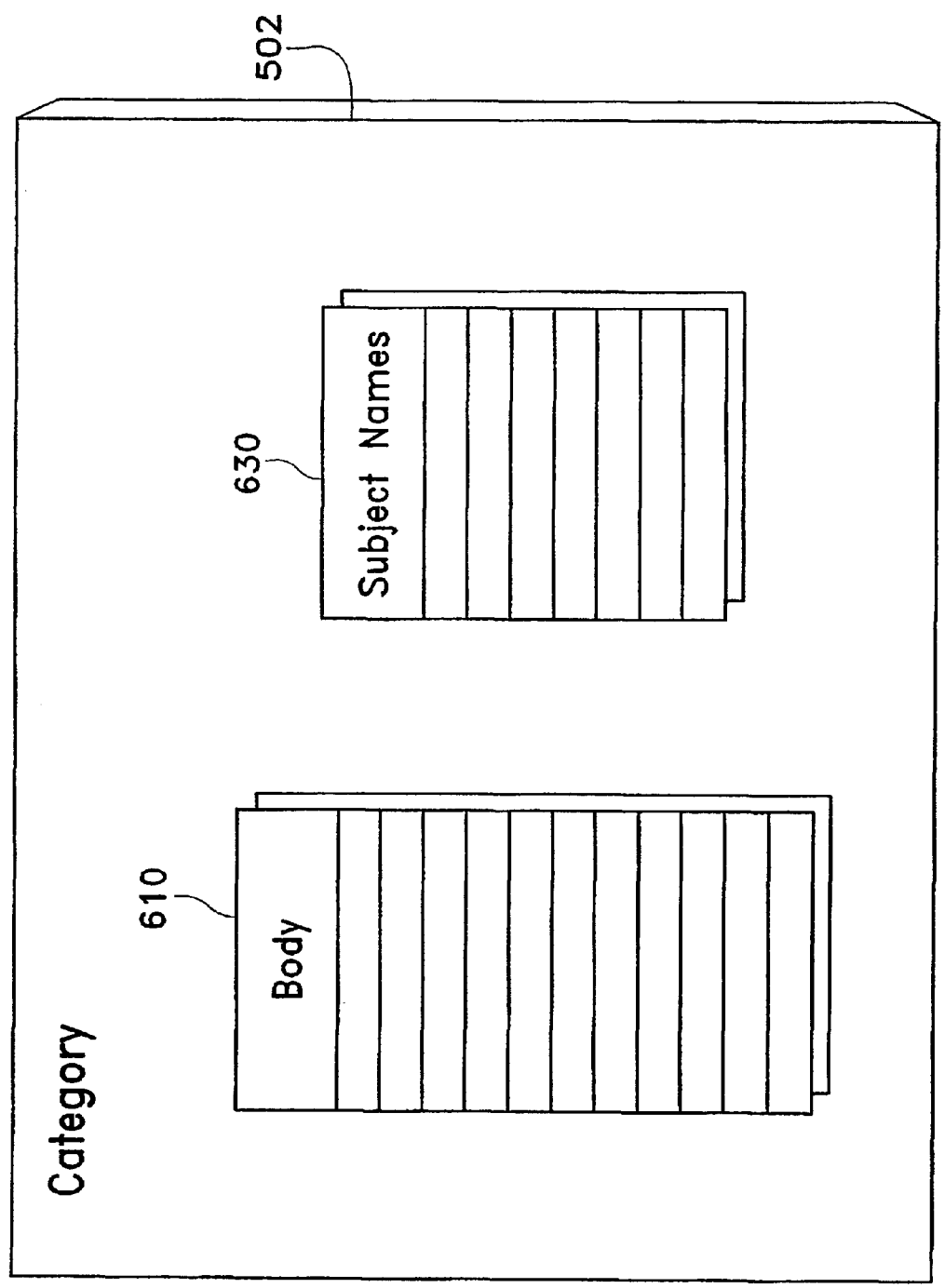
FIG. 6 describes the content of a category as embodied in a robot object.

FIG. 6 describes the content of a category 502. Category 502 comprises body 610 and subject names 630. Body 610 is a list of pointers to condition-action blocks. Such a condition-action block is a representation of an IF-THEN block found in a script program. Subject names 630 are a representation of a listing of SUBJECTS that may optionally be found in a script program.

III. Execution of Gerbil Programs
A. The Internal Structure of a Gerbil Program Now a more detailed explanation of both the structure and the execution of Gerbil programs in the present embodiment will be given. The session document (CGRBLToolDoc) contains all information about a BOT as it is being executed, including two member variables particularly relevant to the current disclosure:

| | |
|---|---|
| CUserRecordSet* | m_pursUsers; |
| CProgram* | m_ppProgram; |

The m_pursUsers structure contains information about each user that is presently conversing with the BOT (stored as a map from UserIDs to CUserRec structures), such as any facts remembered about that user and the focus of attention for that conversation. The m_ppProgram structure contains all the information about the BOT script itself, including the robot object created by the compilation process described above and various run-time variables needed during script execution. The session document also includes a number of other members such as pointers to various display windows and dialogs used during execution, lists of file names used in the BOT script, and so on.

There are two relevant member variables of the present embodiment of a Gerbil program (CProgram):

| | |
|---|---|
| CExeStruct* | ExeProg; |
| CRunStruct* | RunTime; |

The ExeProg contains an executable version of the Gerbil script. The RunTime structure contains variables that are used when executing the Gerbil script.

The CExeStruct contains the following relevant member variables:

| | |
|---|---|
| CCategoryList | PriorityCategories; |
| CCategoryList | DefaultCategories; |
| CCategoryList | SequenceCategories; |
| CCategoryList | StandardCategories; |
| CMapStringToPtr | m_pmspSubjectMap; |

Each CCategoryList contains a list of CCategory objects. Each CCategory contains a set of CConditionActionBlock objects, each with a condition and a list of CAction objects. A CConditionActionBlock is a type of CAction, so CConditionActionBlock objects can recursively contain other CConditionActionBlock objects. A CCategory also contains a list of all the subjects discussed by the category.

The lists PriorityCategories, DefaultCategories, and SequenceCategories are fixed in ordering and are shared among all users. Each user record contains a copy of the list StandardCategories (see below) in which the ordering of categories can dynamically change (according to the focus mechanism). The copy of StandardCategories in the CExeStruct is fixed in order and is used to create the initial copy of StandardCategories for each new user. Finally, the CExeStruct contains a map m_pmspSubjectMap from each subject name to the list of categories that discuss that subject In the present embodiment, the CRunStruct contains three relevant member variables:

| |
|---|
| CUserRec* User; |
| CTypedPtrList<CObList,CCategory*>FocusList; |
| CStringArray m_saActiveSubjects; |

It also contains a number of temporary pointer variables, including Continuation, ActiveCatPos, and SwitchToCategory, which are used in execution as described below. User is a pointer to the user record for the user involved in the current conversation. FocusList is used to store the list of categories that have been activated by the focus of attention mechanism during the current execution of the Gerbil script. It will be used at the end of the run to modify the focus of attention for the current user, as described below. m_saActiveSubjects is used to store the list of subjects that have been activated by the focus of attention mechanism during the current execution of the Gerbil script. It will be used at the end of the run to modify the active subjects map for the current user, as described below.

The CUserRec contains information about the current user and the robot's conversation with the user. In particular, it contains a CMapStringToPtr containing the contents of the memory for the user, in which each attribute name is mapped to a list of strings representing the value of that attribute, and six member variables relevant to the present mechanisms:

| | |
|---|---|
| CCategoryList | AttentionFocus; |
| CTypedPtrList<CObList, CCategory*> | SuppressList; |
| CContinuation* | Continuation; |
| CTypedPtrList<CObList, CContinuation*> | SwitchContinuations; |
| CTypedPtrList<CObList, CContinuation*> | SequenceContinuations; |
| CMapStringToPtr | m_mspActiveSubjects; |

AttentionFocus is a copy of the StandardCategories list from the program executable that describes the attention focus for the BOT's conversation with the current user. The order of the categories in this list may be different than the order in StandardCategories, due to the functioning of the focus mechanism. SuppressList is a list of pointers to the categories that are suppressed in the robot's conversation with the current user. SuppressList may include categories from the PriorityCategories, DefaultCategories, and StandardCategories list. m_mspActiveSubjects is a mapping from subject names to null pointers, indicating the set of active subjects associated with the current conversation. This mapping is used in implementing the Focused command disclosed below. Next, Continuation is NULL unless there is a WaitForResponse command that is currently active. In this case, Continuation points to a CContinuation structure that describes where in the script the WaitForResponse is located and how to resume execution from that point. Finally, the user record contains stacks of continuations that handle interruptions of a Sequence category and switches back from Sequence categories. SwitchContinuations contains a CContinuation for each SwitchTo statement for which a SwitchBack is still possible (much like the call stack in other programming languages), while SequenceContinuations contains a CContinuation for each sequence that has been interrupted by an InterruptSequence command and not yet returned. The functioning of these CContinuation stacks is described further below.

B. The Execution of a Gerbil Program

One main feature of a Gerbil program is its ability to "focus" categories for the express purpose of being more responsive to user communication. The "focusing" of categories, for the purposes of the present invention, is implemented by a combination of explicit and automatic methods. Explicit focusing can be accomplished in one of two ways in the current embodiment. The first focus mechanism, the "Focus" command, is added to the script program to explicitly focus a particular category when the command is executed. As will be explained below, "focusing" in the current embodiment moves the focused category to the front of the attention focus list. Thus, during the course of execution, the runtime executive will generally check the newly focused category earlier than it would have had the category not been focused. As an example, a sample Focus command might look like—Focus "dogs", "cats";—this command would move the category "dogs" to the front of the attention focus list and the category "cats" immediately following it. The Focus command is useful to make certain categories more immediate in the course of conversation and, in particular as to the above example, if the user had recently spoken of "pets".

The second explicit focus mechanism, the "Focus Subjects" command, is similar to the "Focus" command but differs in that it will move a set of unspecified categories, each said category sharing a Subject whereby the Subject is explicitly listed within a "Subjects" command within the category. For example, in a script that discussed the subject of pets, the command Focus Subjects "dogs" could be placed in any category and if said command is executed, then all categories explicitly listing "dogs" as a SUBJECT will be placed to the front of the attention focus list. This command is useful to focus related categories without having to explicitly list them all.

In addition to these explicit focus mechanisms, there is an automatic focus mechanism that works without use of explicit commands. If a category is activated by executing an output statement (such as Say or Do) within the category, then that category is moved to the front of the attention focus list. Additionally, in the current embodiment, if that category contains a Subjects command, then all other categories which share at least one of the arguments of the Subjects command are also moved to the front of the attention focus list. It will be appreciated that other protocols could be observed upon automatic focusing of a category.

The focusing of categories is also used to determine a set of "active subjects" associated with the current state of the conversation. Any time an input is processed that leads to one or more categories being "focused", either through explicit or automatic focus methods, and at least one of these categories is associated with one or more subjects, the set of active subjects is cleared and replaced with the set of all subjects associated with any of the categories that were activated (including any subjects explicitly mentioned in a "focus subjects" command.) The set of active subjects is also used in implementation of the Focused condition described in the BNF above. The Focused condition is true if the topic containing it has at least one associated subject that is also in the set of active subjects.

Another, somewhat related mechanism, "Suppress", is implemented in the current embodiment. "Suppress" is an explicit command that disables the activation of the categories named in the command for the remainder of the course of conversation with that user. Such categories can be placed back into consideration with the use of the "Recover" command. For example, the command—Suppress "dogs";—will suppress the category "dogs" from further discussion, even if an explicit Focus command would purport to move it to the front of the attention focus list.

Now a more detailed description of the current embodiment will be discussed. During execution, each Gerbil command in the present embodiment actually returns a CABlockEnd value that describes what the program should do following the command. This value is normally Continue, indicating that the program should continue by executing the next Gerbil command. It can also be one of the values Waiting, Done, NextCategory, Switch, SwitchBack, NotActivated, or RunTimeError. (The Done, continue, and NextTopic "terminators" that appear at the end of a condition block in a Gerbil code are actually implemented as commands that do nothing other than return the appropriate CABlockEnd value.) In this context, the following is a discussion concerning six Gerbil commands that are relevant to the focus of attention mechanism: Focus, Focus Subjects, WaitForResponse, TryAgain, InterruptSequence, and SwitchTo.

Each Focus command in a Gerbil script has as arguments a list of categories. This list is converted by the compiler into a list of pointers to the actual categories. When the Focus command is executed, these pointers are copied to the end of the RunTime->FocusList structure (to later be brought to the front of the attention focus list.) In addition, all subjects associated with each category are added to the list of active subjects. The C++ code for CFocus::Execute is straightforward and is shown below.

```
POSITION pos = Argvalues.GetHeadPosition();
for (;pos ?= NULL;) {
    ArgCategory = (ArgValues.GetAt(pos))->Category;
    ArgValues.GetNext(pos);
    if(ArgCategory ?= NULL) {
        TRACE("Putting Category \"%s\" on focus list\n",
            ArgCategory->Name);
        Context->m_ppProgram->RunTime->FocusList.AddTail(
                                                    ArgCategory);
    }
    for (int k=0; i<ArgCategory->m_saSubjectNames.GetSize(); k++)
    {
        Context->m_ppProgram->RunTime->
            m_slActivatedSubjects.AddTail(
            ArgCategory->m_saSubjectNames[k]);
    }
}
return Continue;
```

In order to execute a "Focus Subjects" command, the robot executive takes each argument and uses the map m_pmspSubjectMap found in the CExeStruct to determine which categories share that subject. Each of the categories contained in the m_pmspSubjectMap under the subject name is appended to the end of RunTime->FocusList. The name of the subject is also added to the RunTime->m_slActivatedSubjects list.

The WaitForResponse command causes execution on the current input to stop, but before that, sets up a CContinuation telling the Gerbil program where to restart when the next input is processed. This CContinuation is created by the compiler and stored in the CWaitForResponse statement. The code for CWaitForResponse::Execute is trivial; it simply copies the CContinuation pointer into RunTime->User->Continuation and returns Waiting.

A TryAgain command is simply a special case of WaitForResponse in which the CContinuation starts from the previous WaitForResponse rather than the TryAgain command. A TryAgain command is converted into an appropriate CWaitForResponse by the compiler.

An InterruptSequence command can only be used within a Sequence category, and causes the execution of the category to be suspended while all of the standard and default categories are executed. (InterruptSequence can only be used after a WaitForResponse, to prevent possible conflicts in which a category might be executed twice.) It is implemented by adding a CContinuation to the top of the SequenceContinuations stack (allowing nested interruptions within interruptions) and returning the value NextCategory.

Each SwitchTo command in a Gerbil script has the name of a single category as an argument. Again, this category name is converted into a pointer by the compiler. When the SwitchTo command is executed at run-time, this pointer is copied into a member variable RunTime->SwitchToCategory and the value Switch is returned. Furthermore, a CContinuation representing the SwitchTo is copied into User->SwitchContinuations so that the category can be resumed if the target category ends with a SwitchBack. The fact that User->SwitchContinuations is a stack allows arbitrarily deep series of SwitchTo and SwitchBack calls.

In order to prevent cycles in which a category in the attention list is repeatedly executed and then SwitchedTo from another category later in the attention list, the present embodiment of the program checks to make sure that the category has not already been executed before returning any value. If it has already been executed, the value RunTimeError is returned instead. Such cycles can only occur with standard categories. The compiler will check all sequence categories and guarantee that cycles among them will not occur. This is done by viewing each category as a node in a graph and each SwitchTo as an arc, and doing depth-first search to detect cycles in the graph. A WaitForResponse before the SwitchTo eliminates the arc caused by that SwitchTo, as it will prevent cycles from occurring while processing a single input. The C++ code for CSwitchTo::Execute is shown below. The SwitchToOneOf command is a straightforward extension of SwitchTo.

The next level of structure above single commands in a Gerbil script is a CConditionActionBlock. A CConditionActionBlock consists of a condition and a body consisting of a list of commands. When the CConditionActionBlock is executed, the condition is first evaluated. If it is false, the block returns NotActivated immediately. Otherwise, the body statements are executed in order (normally starting with the first statement, but starting with a later statement if the block is part of an active Continuation) until one returns a CABlockEnd value other than Continue. When some other CABlockEnd value is returned, it is passed on as the return value of the CConditionActionBlock.

A CCategory contains an ordered list of CConditionActionBlock objects, and is executed by executing the blocks in succession (normally starting with the first block, but starting with a later block if the CCategory is part of an active Continuation.) If a block returns the value NextCategory, Switch, SwitchBack, Waiting, Done, or RunTimeError, execution of the CCategory stops and the return value is passed on. If a block returns NotActivated, the next block is executed. If a block returns Continue, the next block is activated unless it is an Otherwise block or unless both the current and next blocks are IfChance blocks, in which case it and all other IfChance blocks immediately following it are skipped. If the last block in the category returns Continue or NotActivated, execution of the category is complete and the value NextCategory is returned. Meanwhile, if the category is a standard category, any output command (currently all variants of "Say" or "Do") will cause a flag to be set in the category. If this flag is set at the end of the execution of the category, the category is appended to the end of RunTime->FocusList so that it will be automatically moved to the front of the focus of attention list. Furthermore, the subjects associated with the category are appended to the list RunTime->m_saActivatedSubjects. This automatic focus allows the attention focus mechanism to function even without the use of Focus statements. It will be appreciated that other implementations might decide whether a topic should be automatically focused in a different way, for example by automatically focusing on any topic in which the condition in at least one CConditionActionBlock has value true, or any topic in which any action is executed.

This behavior can be overridden by including the command DontFocus in any of the blocks that should not trigger the automatic focus mechanism. Furthermore, if the category is given a list of SUBJECTS in the Gerbil script, when the category is focused using automatic focus, all other

```
CCategory* DestCategory = Destinations[selection]->Category;
ASSERT(DestCategory != NULL);
if ((DestCategory->Executed) &&
    (DestCategory->Priority != SequencePriority))
{
        // run-time error to switch to an already-executed non-sequence category
        Context->m_ppProgram->PrintTraceMsg("ERROR", SrcFileName,
                                                        SrcLine);
        return RunTimeError;
}
// record what category is being switched to in the run-time data structure
Context->m_ppProgram->RunTime->SwitchToCategory = DestCategory;
// and remember where it was called from
Context->m_ppProgram->RunTime->User->SwitchContinuations.AddHead(
        m_pccCallingLocation);
return Switch;
``` categories that share at least one SUBJECT with said category are also appended to the end of RunTime->FocusList and will be automatically moved to the front of the focus of attention list.

When a user enters an input, the function CProgram::Run is called. This function does a number of low-level tasks (such as setting RunTime->User) and then executes the Gerbil program. First, it clears FocusList and m_slActivatedSubjects so that it can keep track of categories that are focused on during the execution. To prevent possible ambiguities in the ordering of category executions, Focusing actions do not have any effect until the script is finished executing on the current input. It will be appreciated that other implementations of an attention focus mechanism might dynamically reorder the attention focus list during the processing of an input.

The CProgram is executed by repeatedly selecting and executing categories, as shown in the code fragment below from CProgram::Run. RunTime->ActivePriority and RunTime->ActiveCatPos are used to keep track of what category is currently being executed. Once execution is complete, RunTime->FocusList is used to move those categories that were activated or focused on during execution to the front of the Focus of Attention, focusing the robot's attention on these categories. The function CProgram::Refocus itself is straightforward, simply going through RunTime->FocusList, and for each element, removing it from its previous position in the attention focus list and placing it at the front of the list. If the list RunTime->m_saActivatedSubjects is non-empty, CProgram::Refocus also updates the active subject map for the current user, clearing the map and replacing it with the contents of RunTime->m_saActivatedSubjects.

```
// mark all categories as un-executed
ThisUser—>AttentionFocus.MarkUndone();
ProgramExecutable—>PriorityCategories.MarkUndone();
ProgramExecutable—>DefaultCategories.MarkUndone();
ProgramExecutable—>SequenceCategories.MarkUndone();
// Clean up focus list and do a bunch of other initialization tasks
RunTime—>InitializeForRun();
// Execute all of the categories, in order.
CABlockEnd Return Val = NextCategory;
CCategory* ActiveCategory = GetNextCategory(ThisDoc, ThisUser,
                                ExecutionType, ReturnVal);
while (ActiveCategory != NULL) {
        ReturnVal = ActiveCategory—>Run(ThisDoc);
        ActiveCategory = GetNextCategory(ThisDoc, ThisUser, ExecutionType,
                                ReturnVal);
}
// (other tasks done here such as handling output buffers)
// handle all focusing actions
Refocus();
```

Most of the work involved in deciding which categories to execute is done inside of CProgram::GetNextCategory. GetNextCategory uses RunTime->ActivePriority, RunTime->ActiveCatPos, and the ReturnVal from the previous category, and selects the next category to execute. If ReturnVal is NextCategory, the program will simply select the next category from the CategoryList for the current ActivePriority (Priority, Standard, or Default), according to the selection mechanism operative for that category and switching to the next priority level if necessary. (Recall that the Priority and Default categories are found in the CExeStruct, while the standard categories are found in RunTime->User->AttentionFocus. Sequence categories are never executed unless activated with a SwitchTo command, so the list ExeProg->SequenceCategories is never executed directly.) If there is an active CContinuation remaining from a previous execution (due to a WaitForResponse), it is activated immediately after the Priority categories. CContinuations are activated by returning the appropriate category and setting RunTime->Continuation, which will cause execution of the category to begin at the appropriate place within the category rather than the beginning.

If ReturnVal is Switch, the target category (from RunTime->SwitchToCategory) is selected. If ReturnVal is SwitchBack, the first CContinuation from SwitchContinuations is removed from the stack and used to choose a category and set up a continuation, and set RunTime->ActiveCatPos when necessary. (Since SwitchBack can only be used within a Sequence category, there is guaranteed to be at least one continuation in SwitchContinuations. The process is equivalent to the method of returning from a subroutine in other programming languages.) If ReturnVal is Waiting, execution ceases since a WaitForResponse has been executed. Similarly, if ReturnVal is RunTimeError, execution ceases and the stack of SwitchContinuations and SequenceContinuations is cleared. (RunTimeError is presently returned only in the event of a SwitchTo cycle violation.) Finally, if ReturnVal is Done (recall that a category cannot return value NotActivated or Continue), execution stops unless there was an InterruptSequence that has not yet been resumed. Recall that InterruptSequence stops execution of a Sequence category while all of the Standard and Default categories are executed, and then resumes execution of the Sequence category. Therefore, if a Done is reached while there is at least one CContinuation in the SequenceContinuations stack, that Sequence category is resumed. In the case where there is no SequenceContinuation, the SwitchContinuations stack can also be cleared, as there is no possibility of returning from any SwitchTo statements once a Done (that is not ending an interruption) is executed.

IV. Implementation of Automatic Script Authoring

A. Overview and Opertion

Having described the general environment in which virtual robots execute, and in particular, virtual robots built with the "NeuroScript" language, methods of automatic script authoring will now be described, as contemplated by the present invention. The BNF description provided above gives the necessary framework in the present embodiment for objects such as examples and topics. It will be appreciated that for the purposes of the present invention, these notions of examples and topics are to be construed broadly and cover normal natural language utterances and however they may be structured in a computing environment as is well-known to those skilled in the art.

Figure 7:
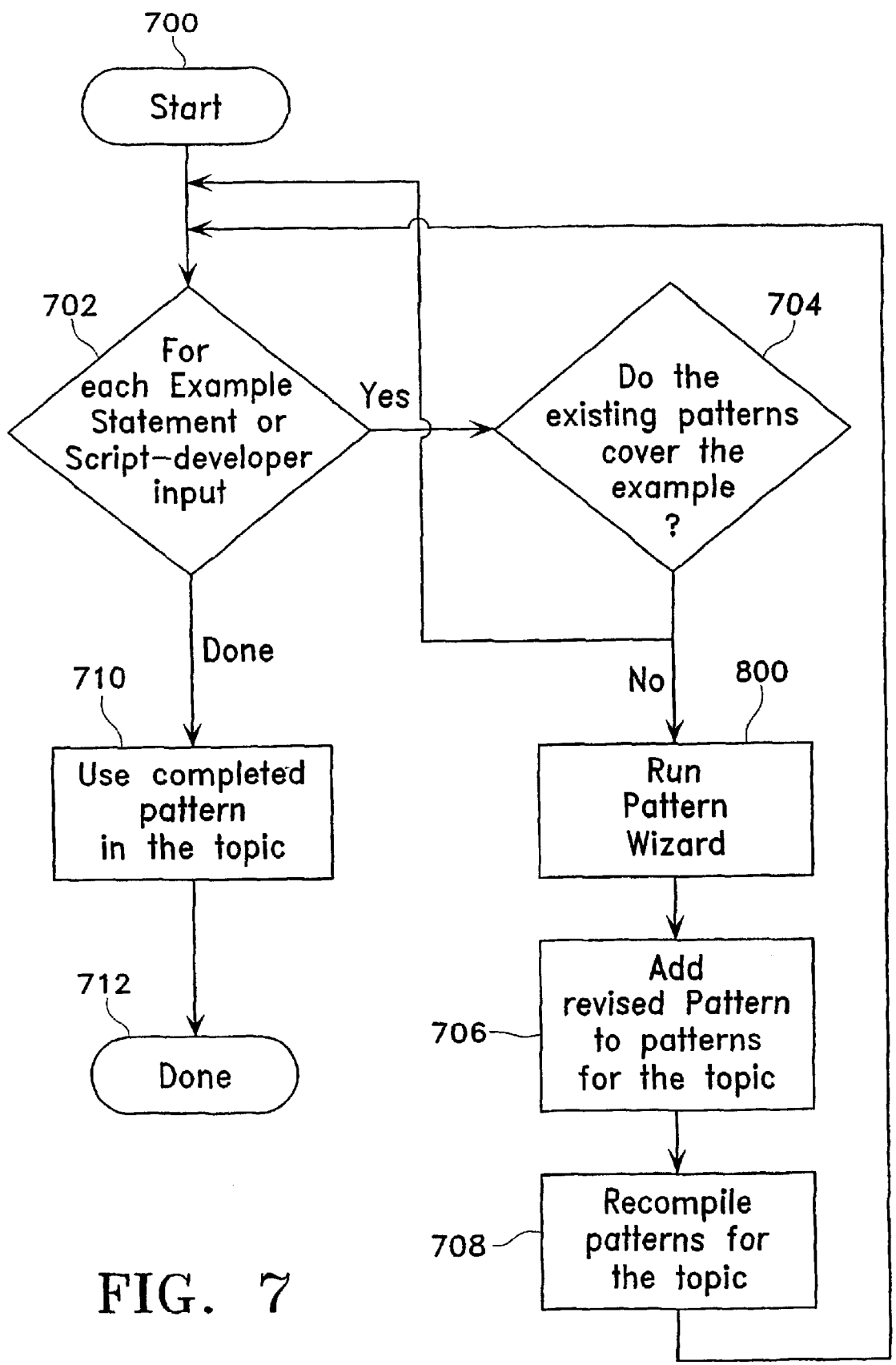
FIG. 7 depicts one embodiment of an automated method for authoring topic scripts for virtual robots in accordance with the principles of the present invention.

FIG. 7 depicts one embodiment of the presently claimed methods of automatic script authoring. The description of this method will be made in connection with two example uses of the method. It will be appreciated, however, that these two examples are provided merely for illustration of the present invention and that the scope of the present invention should in no way be limited to the present disclosure of these examples.

EXAMPLE 1

Editing an Existing Topic

To illustrate the operation of the present invention, we will demonstrate the execution of the present invention on the topic shown below:

Topic "Neuromedia's markets" is

Subjects "Neuromedia", "market";
    If    ?DescriptionQuestion    Contains "Neuromedia#*market"
    Then
      Say "Neuromedia's markets included customer service and",
      "on-line sales";
    Example "What are Neuromedia's markets?",
      "What are the markets for Neuromedia products?",
      "What are the markets for your company's software?";
    Done
EndTopic The software begins executing as shown in FIG. 7 at 700. At 702, the method iterates through the example statements found in the topic "Neuromedia's markets", shown above. The first example, "What are Neuromedia's markets?" is tested at 704 and found to be covered by the existing patterns, so execution returns to 702. One manner of testing that occurs at step 704 comprises running the Example statement in the BOT and determining whether the category is activated by the BOT. In this fashion, the existing patterns "Neuromedia#*market" cover—by way of matching the pattern—this particular example statement. It will be appreciated that this testing can be done either within the context of a separate standalone Gerbil parser or within the context of the full Gerbil compiler. It will further be appreciated that for example statements that are to be tested with a When-Focused condition or other restrictions, appropriate flags may need to be set within the testing environment before the example statement is tested.

Figure 8:
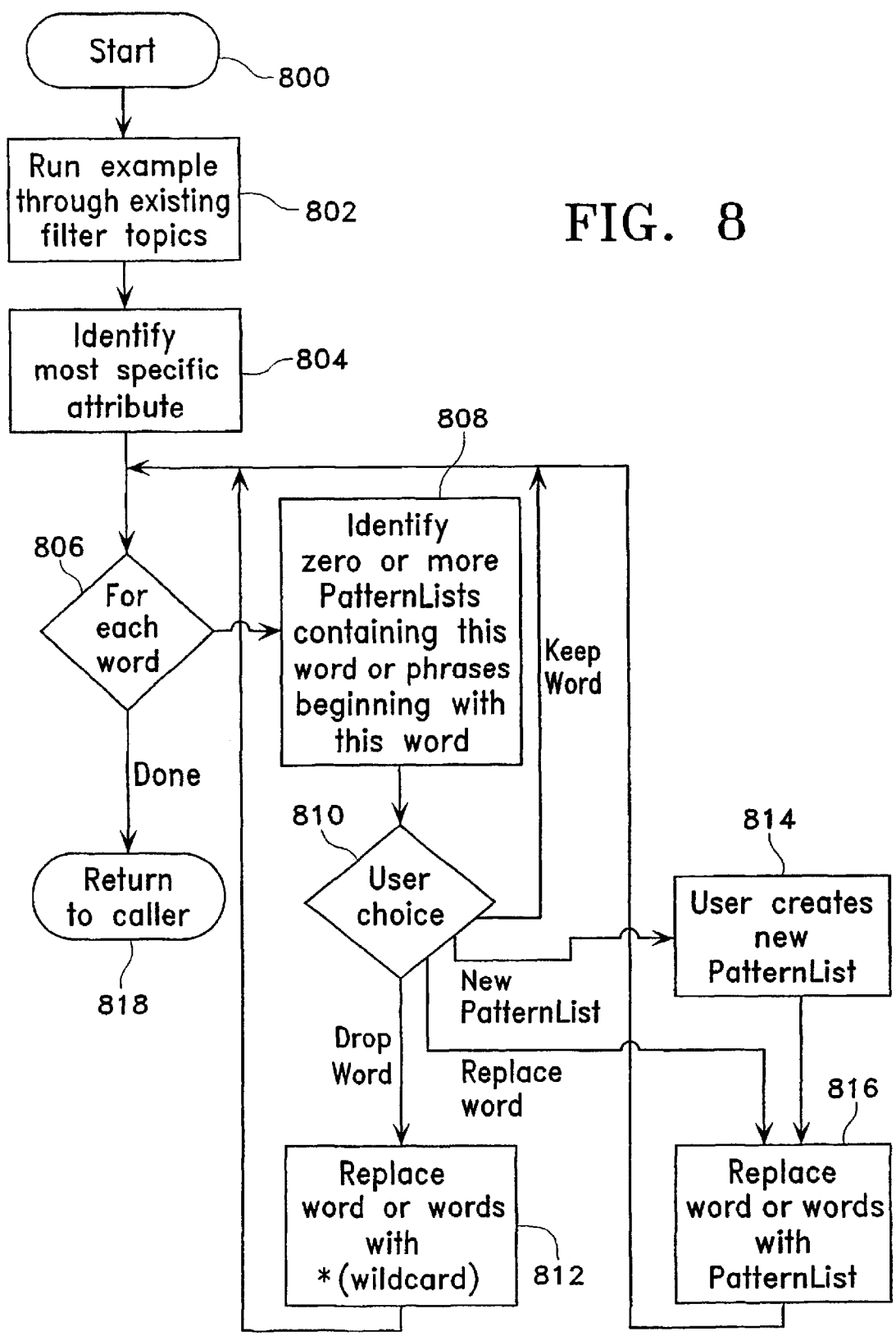
FIG. 8 depicts an embodiment of an automated method for creating or editing patterns for topic scripts.

The next example, "What are the markets for Neuromedia products?", is now tested at 704 and found to be not covered by the existing patterns—i.e. does not match the above pattern, so execution transfers to the "Pattern Wizard" at 800, as depicted in FIG. 8.

In order to generate a pattern for the topic under construction, the Pattern Wizard may employ a memory attribute to test and an initial value for the attribute. In order to guarantee that the pattern being created covers the example, the initial value should be generated from the example. In one embodiment of the present invention, the Pattern Wizard might use the attribute ?WhatUserSaid and set its initial value to the entire text of the example being processed. In another embodiment of the present invention, the example might be run through a set of "filter topics". A "filter topic" may be a Priority Topic in a Gerbil script or any other topic that may be executed prior to the execution of the topic being edited or created. One function of a filter topic is to filter an input to test whether it fits certain criteria, rather than to respond to particular user inputs.

For example, one embodiment of a set of filter topics is a set of "Standard Question" scripts in Gerbil that examine a user input and determine whether it is one of a variety of question types, such as DescriptionQuestion, LocationQuestion, TimeQuestion, etc. The "Standard Question" scripts also attempt to determine a more particular subject for each question by stripping off phrases such as "tell me about" and "what is". For instance, the example "What are the markets for Neuromedia products?" is classified as a DescriptionQuestion, and the attribute ?DescriptionQuestion is set to the value "the markets for Neuromedia products".

In the present embodiment, the example is run through the entire set of Priority Topics in the script. As disclosed in the BNF description of the Gerbil language above, attributes may be "registered" in the script and assigned "specificity" values that impose an ordering on the specificity of attributes. After the example is run through the set of Priority Topics, the system examines each registered attribute to determine which attributes have been set by the Priority Topics. If one or more have been set, the most specific one may be chosen as the attribute to be used by the Pattern Wizard, and its value used as the initial value for the pattern. If no attributes have been set, the attribute ?WhatUserMeant (i.e. the user's input statement with spell-checking applied) is used and its value is taken as the initial value for the pattern. It will be appreciated that other methods of selecting an attribute and initial value, such as asking the user to select from among the attributes set in the priority topics, are also possible and that the present invention should not be limited to any particular method of selecting a starting attribute and value.

Returning to the first example, the example statement is run at step 802 through the filter topics in the existing script, and a number of attributes are set to particular values. At 804, the attribute ?DescriptionQuestion is chosen as the most specific of these attributes, and its initial value is "the markets for Neuromedia products". Other, more general, classifications of the example, e.g. as an ?AnyQuestion input, are ignored. If filter topics are not used for processing, then steps 802 and 804 may be optionally skipped, and the pattern wizard may alternatively start processing at step 806.

FIGS. 10, 11, 12, 13, and 14 depict embodiments of screen shots of dialog boxes that the Pattern Wizard calls forth to process the example statement. It will be appreciated that wizard technology and the dialog boxes that implement them are well known to those skilled in the art. At step 806, the system begins with the first word in the attribute value, in this case the word "the", and presents the dialog box shown in FIG. 10. The system identifies at step 808 a set of zero or more pattern lists that match the present word. In an alternative embodiment, phrases consisting of two or more words beginning with the current word may also be considered. Thus, at step 808 the system would identify pattern lists matching the word "the", pattern lists matching the phrase "the markets", pattern lists matching the phrase "the markets for", and so on.

In the present example, three PatternLists are found. The PatternList ARTICLES is the first one found, and the elements of this PatternList are displayed in the "Contents" box on the right in FIG. 10.

The user is now given a choice of options at step 810. Since the word "the" is not important to the question being answered, the user might choose to eliminate the word at step 812 and replace it with a*wildcard character. The pattern now becomes "*markets for Neuromedia products" and execution returns to 806 as depicted in FIG. 11.

Figure 11:
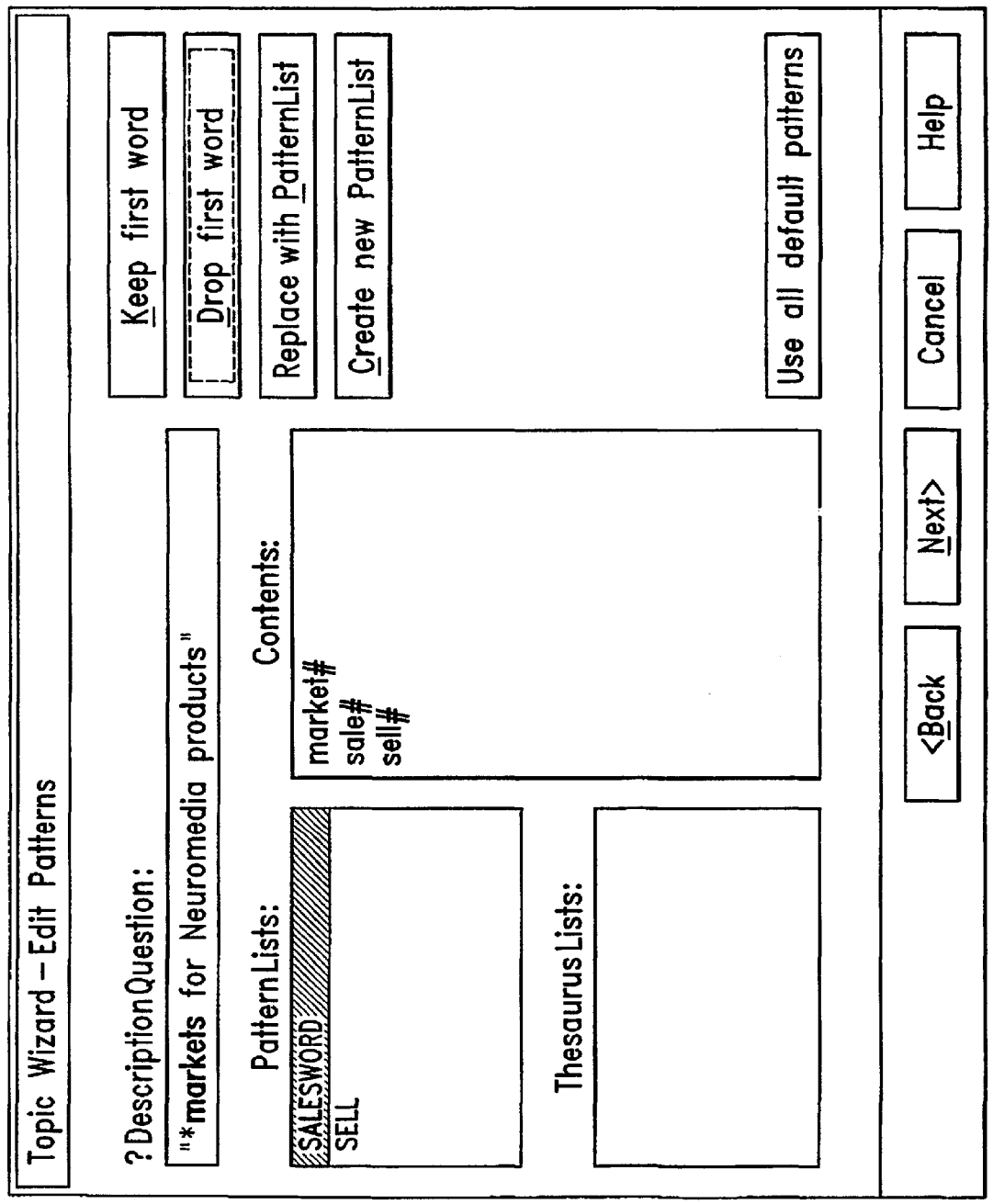

The system now continues with the next word, "markets", as illustrated in FIG. 11. The system identifies at step 808 the set of PatternLists (SALESWORD, SELL) matching the word "markets" and displays them. As discussed above, the system may also look for pattern lists matching the phrase "markets for", "markets for Neuromedia", and so on. At this point, the user would look at the list of words in PatternLists SALES WORDS and SELL and decide whether the particular words found in one of these PatternLists would be appropriate substitution for the word "markets" in the topic being built. In this case, a typical user might decide that neither PattenList is an appropriate substitution for "markets" and thus choose at step 810 to keep the word "markets" in the pattern, with execution returning to step 806. It will be noted that the user might instead have chosen to select one of these PatternLists or to create a suitable new PatternList, as will be illustrated below.

Figure 12:
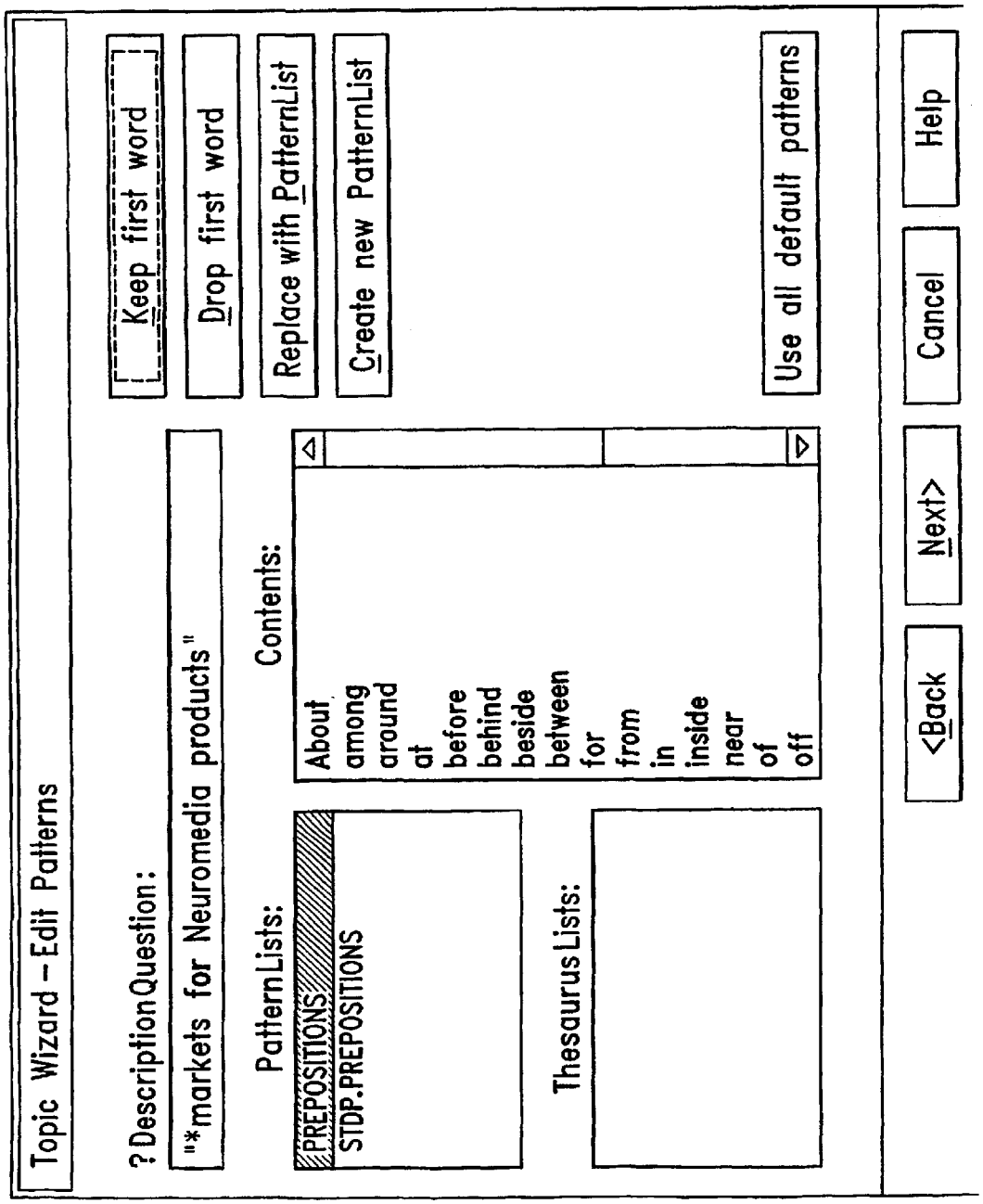

The system continues with the word "for", as illustrated in FIG. 12. Again, the system identifies at step 808 a set of PatternLists and displays them. In this case, a typical user may decide that the word "for" is not essential to the topic being built, and choose at step 810 to replace 812 the word with a * wildcard, resulting in the pattern "*markets*Neuromedia products", and execution returns to step 806.

The system continues with the word "Neuromedia"; as illustrated in FIG. 13. The system identifies at step 808 a set of PatternLists and displays them in the dialog. In this case, the user might decide that the PatternList NEUROMEDIASYNONYM includes an appropriate set of synonyms for the name Neuromedia (such as "your company") and so choose at step 810 to replace the word with the PattenList at step 816. The new pattern is now "*markets*"+ NEUROMEDIASYNONYM+"products", and execution returns to step 806.

Figure 14:
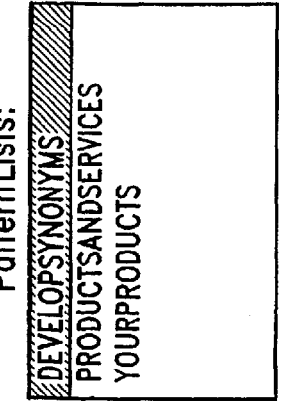

Finally, the system continues with the word "products", as illustrated in FIG. 14. The system identifies at step 808 a set of PatternLists and displays them in the dialog. The user might at this point select the PatternList PRODUCTS at step 810 to replace the word at step 816, and execution returns to step 806.

All words in the input have now been processed, so execution proceeds to 818 and returns to the caller. At step 706 in FIG. 7, the new pattern "*markets*"+ NEUROMEDIASYNONYM+PRODUCTS is added to the list of matching patterns being tested for the attribute ?DescriptionQuestion. At step 708 in FIG. 7, the system recompiles the set of patterns for the topic so that further examples can be tested against the newly created patterns. It will be appreciated that it might suffice to recompile and link the patterns for the topic and that a full recompilation of the BOT script is not required. Alternatively, the full recompilation could be done. After the recompilation, execution now returns to step 702. It will additionally be appreciated that the no new patterns may be returned from step 800, in which case no recompilation is necessary.

The system then processes the last example statement. The third example, "What are the markets for your company's software?", is now tested at step 704 against the patterns for the topic. Since the phrase "your company's" is included in the PatternList NEUROMEDIA and the word "software" is included in the PatternList PRODUCTS, the new pattern that was just added, "*markets*"+ NEUROMEDIASYNONYM+PRODUCTS", covers the new example, and the test at step 704 succeeds, returning execution to step 702.

At this point, there are no further example statements in the topic, so the new pattern is written into the script for the topic at step 710, and execution terminates at step 712. The routine that called the Pattern Wizard converts the template that has been constructed for the topic into a script using techniques well-known to one skilled in the art of automatic code generation, as for example in Microsoft's Visual Studio Wizards. The system may then display the final version of the script file containing the topic for the user's inspection. The final version of the topic as it appears in the script after execution is shown in FIG. 15.

Figure 9:
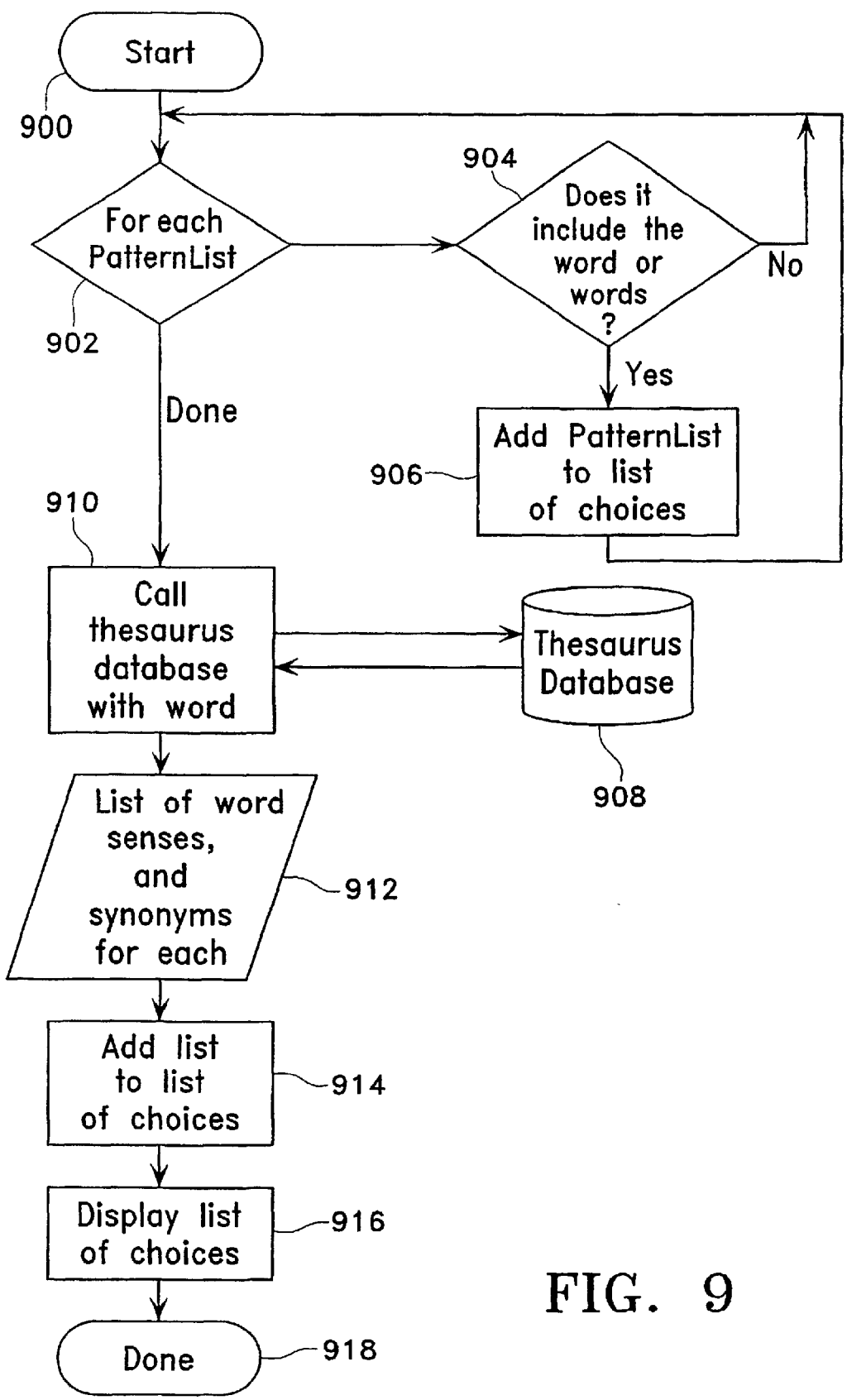
FIG. 9 depicts an embodiment of an automated method for selecting pattern lists for use in patterns for topic scripts.

An alternative embodiment of selecting a set of pattern lists to match a particular word or words within an example statement is depicted in FIG. 9. Processing starts at step 900, which might be invoked by the pattern wizard at step 808 in FIG. 8. At step 902, the system iterates through a set of pattern lists found in the BOT script. For each such pattern list, the system at step 904 tests whether the pattern list contains the word or words being matched. If not, execution returns to 902 and another pattern list is selected. If there is a match, the pattern list is added at step 906 to the list of pattern lists being accumulated.

After the set of pattern lists have been checked, the system calls at step 910 a thesaurus database 908 or other such database containing synonyms. The word in question is passed as a parameter to the thesaurus database 908. It will be appreciated that there are many ways to implement such a database call, for example RPC if the database is a standalone remote data source, or any other standard procedure calling mechanisms well-known to those skilled in the art. The database returns from the call with a list 912 of zero or more lists of synonyms, each such list representing a particular and possibly distinct sense or meaning of the word passed to the database.

At step 914, each list of synonyms may be treated as if it were a pattern list found in the BOT script and added to the list of pattern lists being accumulated. The entire list of pattern lists may be displayed to the user at step 916. This list can be displayed in various ways, for instance as a single list or as separate lists for pattern lists found in the BOT script and pattern lists found in the thesaurus database. After the list of pattern lists is displayed, execution returns to the caller at step 918.

EXAMPLE 2

The Creation of a New Topic

The second example depicts the use of methods of the present invention to create new topic scripts, not merely edit existing scripts. The BOT author begins by entering one or more questions that typify a given topic of conversation. In our example, for the Topic "Walter", the user might input "Who is Walter?" and "Tell me who this Dr. Tackett is." The user also enters an answer, "Walter is the CEO of Neuromedia, Inc." and a subject, "Neuromedia".

The script authoring then proceeds as in the embodiment of the present invention, as illustrated in FIG. 7. The first Example statement entered by the script developer is "Who is Walter?". The newly created topic does not yet have any patterns so the existing patterns (tested at 704) do not cover the example.

The software now runs the Pattern Wizard at 800 and brings up a dialog box similar to the ones shown in FIGS.

10–14. The example is run through the existing filter topics in the script at step 802. At step 804, the software identifies that the most specific attribute for the example is ?WhoQuestion with value "Walter". This input has only one word, Walter, which is selected at 806. The Pattern Wizard searches at 808 for PatternLists containing "Walter" and does not find any. At step 810, the user is presented with a choice of options. The user opts 814 to create a new PatternList entitled WALTER. The user adds the words "Walter", "Walt", and "Dr. Tackett" to the new PatternList, which is incorporated into the script file. The word "Walter" is replaced 816 in the pattern with the PatternList WALTER, leaving the pattern ?WhoQuestion Contains WALTER. At this point, all the words in the input have been covered, so the Pattern Wizard exits at 818. The new pattern is appended at 706 to the existing patterns for the topic. There are no existing patterns so the pattern simply becomes the new pattern ?WhoQuestion Contains WALTER. The pattern is compiled at 708 and execution returns to the loop at 702.

The next Example statement entered by the script developer is "Tell me who this Dr. Tackett is". At 704, the Example is tested to see whether it is covered by the existing patterns. This example is classified as a ?WhoQuestion with the subject "this Dr. Tackett". The PatternList WALTER contains the phrase "Dr. Tackett", so the existing pattern covers this example and execution returns to the loop at 702.

At this point, all the Example statements have been tested, so execution proceeds to use the new pattern at 710 in the newly created topic and execution terminates at 712. The newly created script is shown below:

Topic "Who is Walter?" is
Subjects "Walter";
    If ?WhoQuestion Contains WALTER
    Then
        Example "Who is Walter?",
            "Tell me who this Dr. Tackett is.";
        Say "Walter is the CEO of Neuromedia, Inc.";
    Done
EndTopic
PatternList WALTER is "Walter", "Walt", "Dr. Tackett";

B. Implementation of the Present Invention

The following is a listing of the source code of one embodiment of a main procedure implementing the methods of the present invention. It will be appreciated that this source code is one manner of implementing the present invention in the context of a virtual robot. The full scope of the present invention contemplates, however, any system that automatically aids in the authoring of scripts employed in communicating in natural language. A fuller description of this present embodiment may be found in the attached microfiche deposit.

TABLE 1

MAIN PROCEDURE

```
// Run the Pattern Wizard on each non-covered example
// Test all non-focused examples
CString strAttribute, strPattern;
BOOL bCancelled = FALSE;
BOOL bPatternWizardUsed = FALSE;
for (int i=0; i<saExamples.GetSize(); i++) {
    // Test the condition
    if (! pProgram—>AuthorTestCondition(pThisBlock—>Condition, saExamples[i],
                                        FALSE, NULL))
    {
        // create a new pattern and allow the user to edit it.
        pProgram—>AuthorGetBestPattern(strAttribute, strPattern);
        bPatternWizardUsed = TRUE;
        strPattern = "\"" + strPattern + "\"";
        if (! RunPatternWizardDialog(strAttribute, strPattern, FALSE, pProgram))
        {
            bCancelled = TRUE;
            break;
        }
        AddMatchToCondition(pThisBlock—>Condition, strAttribute, strPattern,
                            FALSE, pTestCategory);
        if (! m_bNewPList) {
            // Update the condition
            VERIFY(LinkPatternReferences(pProgram));
        }
    }
}
if (bCancelled) {
    break;
}
// Test focused examples
for (i=0; i<saFocusedExamples.GetSize(); i++) {
    // Test the condition
    if (! pProgram—>AuthorTestCondition(pThisBlock—>Condition,
        saFocusedExamples[i], TRUE, pTestCategory))
    {
        pProgram—>AuthorGetBestPattern(strAttribute, strPattern);
        bPatternWizardUsed = TRUE;
        strPattern = "\"" + strPattern + "\"";
        if (! RunPatternWizardDialog(strAttribute, strPattern, TRUE, pProgram))
        {
            bCancelled = TRUE;
            break;
```

TABLE 1-continued

MAIN PROCEDURE

```
        }
        AddMatchToCondition(pThisBlock—>Condition, strAttribute,
                            strPattern, TRUE, pTestCategory);
        if (! m__bNewPList) {
            // Update the condition
            VERIFY(LinkPatternReferences(pProgram));
        }
    }
}
if (bCancelled) {
    break;
}
if (! bPatternWizardUsed) {
    AfxMessageBox("All of the examples in this topic already work.");
    break;
}
// Replace the old patterns in the script with the brand new ones.
CString strGerbil;
if (pThisBlock—>Condition—>WhatItIs() == ActIfDisjunctive) {
    strGerbil = pThisBlock—>Condition—>GerbilCode(m__nBlockStartCol + 4);
} else {
    strGerbil = pThisBlock—>Condition—>GerbilCode(-1); // no indentation or splitting
}
// note that GerbilCode() does not include an "If" or "Then"
strGerbil = "If" + strGerbil + "\n";
// indent the "Then" properly
for (i=m__nBlockStartCol; i>=4; i-=4) {
    strGerbil += "\t";
}
for (; i>0; i--) {
    strGerbil += " ";
}
strGerbil += "Then\n";
// Find the extent of the condition
Builder—>GotoPositionInStrings(m__nBlockStartLine, m__nBlockStartCol);
VERIFY(Builder—>ScanNextToken());
int nStartPos = Builder—>TokenStartPos();
while (1) {
    if ((! Builder—>ScanNextToken()) || (Builder—>m__nLastTokenType == EndOfF)) {
        AfxMessageBox("An error occurred while searching for the end of the
condition");
        break;
    }
    if ((Builder—>m__nLastTokenType == Symbol) &&
        (! Builder—>TokenFound().CompareNoCase("Then")))
    {
        // we've found the end; substitute the condition in.
        m__pEditView—>SelectRegion(m__nBlockStartLine, nStartPos,
            Builder—>m__nLineNum, Builder—>m__nLastTokenEndPos);
        m__pEditView—>ReplaceSelection(strGerbil, FALSE, TRUE);
        break;
    }
}
```

It has thus been shown in this specification various methods and mechanisms for automatic editing and creation of topics within a virtual robot. It will be appreciated that various other embodiments of the present invention are possible and known to those skilled in the art and that the scope of the present invention includes such other embodiments.

What is claimed is:

1. A method for editing a topic script that controls how a virtual robot processes user input to interact with the user providing the user input, wherein:

the topic script includes an example statement and a pattern, the example statement has one or more words, wherein the example statement is representative of user input; and the virtual robot matches the pattern and the user input to determine whether to activate the topic script in response to the user input, the editing method comprising:

matching the example statement and the pattern to determine if the user input of which the example statement is representative will cause the virtual robot to activate the topic script; and if it is determined that the user input of which the example statement is representative will not cause the virtual robot to activate the topic script, creating a revised pattern for the topic script, wherein the revised pattern creating step includes:

for one or more words in the example statement,
identifying a pattern list for the one or more words in the example statement, wherein the pattern list includes one or more elements that are substitutes for the one or more words in the example statement, and
adding into the revised pattern the one or more words in the example statement or the pattern list.

2. The method of claim 1 further comprising:
filtering the example statement using one or more filter topic scripts.

3. The method of claim 2, wherein the filter topic scripts include question scripts, wherein the question scripts determine whether the example statement is one of a variety of question types.

4. The method of claim 2, wherein one or more of the filter topic scripts are configured to determine a subject of the example statement.

5. The method of claim 1, wherein a pattern list is identified for a group of two or more words in the example statement at a time.

6. The method of claim 1, wherein one of the elements of the pattern list is a wildcard character.

7. The method of claim 1, wherein the example statement includes a first and a second example statement, and wherein matching the example statement and the pattern comprises:
matching the first example statement and the pattern,
if it is determined that the first example statement matches the pattern, matching the second example statement and the pattern, and
if it is determined that the second example statement does not match the pattern, creating the revised pattern based on the second example statement.

8. The method of claim 1, wherein the example statement includes a first and a second example statement, and wherein matching the example statement and the pattern comprises:
matching the first example statement and the pattern,
if it is determined that the first example statement does not match the pattern,
revising the pattern based on the first example statement, and
matching the second example statement and the revised pattern, and
if it is determined that the second example statement does not match the pattern,
further revising the pattern based on the second example statement.

9. The method of claim 1, wherein the example statement has one or more phrases, wherein each phrase includes one or more words, and wherein the revised pattern creating step comprises:
for one or more phrases in the example statement,
identifying a pattern list for each phrase in the example statement, wherein the pattern list includes one or more elements that are substitutes for the phrase in the example statement, and
adding into the revised pattern the phrase in the example statement or the pattern list.

10. The method of claim 1, wherein the pattern and the revised pattern are compiled with the topic script.

11. The method of claim 1, wherein identifying a pattern list comprises:
iterating through a set of pattern lists; and
for each pattern list,
matching the word or words in the example statement to the word or words in the pattern list.

12. The method of claim 11 further comprising:
generating a list of synonyms for the word or words in the example statement using a database containing synonyms.

13. The method of claim 1, wherein the pattern is created in response to a user input.

14. A method of creating a topic script that controls how a virtual robot processes user input to interact with the user providing the user input, wherein:
the topic script includes a first example statement,
the first example statement has one or more words, wherein the example statement is representative of user input,
the method comprising:
for one or more words in the first example statement,
identifying a pattern list for the one or more words in the first example statement, wherein the pattern list includes one or more elements that are substitutes for the one or more words in the first example statement, and
creating a pattern using the one or more words in the first example statement or the pattern list,
wherein the virtual robot matches the pattern and the user input to determine whether to activate the topic script in response to the user input.

15. The method of claim 14, wherein the topic script includes a second example statement, and further comprising:
matching the second example statement and the pattern, wherein the second example statement has one or more words representative of user input;
if it is determined that the second example statement will not cause the topic script to be activated, creating a revised pattern for the topic script, wherein the revised pattern creating step includes:
identifying a pattern list for the one or more words in the second example statement, wherein the pattern list includes one or more elements that are substitutes for the one or more words in the second example statement, and
creating the revised pattern using the one or more words in the second example statement or the pattern list.

16. The method of claim 14, wherein the first example statement has one or more phrases, wherein each phrase includes one or more words, and for one or more phrases in the example statement,
identifying a pattern list for each phrase in the first example statement, wherein the pattern list includes one or more elements that are substitutes for the phrase in the first example statement, and
adding into the revised pattern the phrase in the first example statement or the pattern list.

17. The method of claim 14, wherein the topic script includes a second example statement, and if it is determined that the first example statement does not match the pattern,
revising the pattern based on the first example statement, and
matching the second example statement and the revised pattern, and
if it is determined that the second example statement does not match the pattern, further revising the pattern based on the second example statement.

18. The method of claim 14, wherein the pattern and the revised pattern are compiled with the topic script.

19. The method of claim 14, wherein identifying a pattern list comprises:
iterating through a set of pattern lists; and
for each pattern list,
matching the word or words in the first example statement to the word or words in the pattern list.

20. The method of claim 19 further comprising:
generating a list of synonyms for the word or words in the first example statement using a database containing synonyms.

21. A computer-readable storage medium containing computer executable code to edit a topic script that controls how a virtual robot processes user input to interact with the user providing the user input, wherein:

the topic script includes an example statement and a pattern, the example statement has one or more words, wherein the example statement is representative of user inputs, and the virtual robot matches the pattern and the user input to determine whether to activate the topic script in response to the user input, the computer being instructed to operate as follows:

matching the example statement and the pattern to determine if the user input of which the example statement is representative will cause the virtual robot to activate the topic script; and if it is determined that the user input of which the example statement is representative will not cause the virtual robot to activate the topic script, creating a revised pattern for the topic script, wherein the revised pattern creating step includes:

for one or more words in the example statement, identifying a pattern list for the one or more words in the example statement, wherein the pattern list includes one or more elements that are substitutes for the one or more words in the example statement, and adding into the revised pattern the one or more words in the example statement or the pattern list.

22. The computer-readable storage medium of claim 21, wherein the example statement includes a first and a second example statement, wherein matching the example statement and the pattern comprises:

matching the first example statement and the pattern, if it is determined that the first example statement matches the pattern, matching the second example statement and the pattern, and if it is determined that the second example statement does not match the pattern, creating the revised pattern based on the second example statement.

23. The computer-readable storage medium of claim 21, wherein the example statement includes a first and second example statement, wherein matching the example statement and the pattern comprises:

matching the first example statement and the pattern, if it is determined that the first example statement does not match the pattern, revising the pattern based on the first example statement, and matching the second example statement and the revised pattern, and if it is determined that the second example statement does not match the pattern, further revising the pattern based on the second example statement.

24. The computer-readable storage medium of claim 21, wherein the example statement has one or more phrases, wherein each phrase includes one or more words, and wherein the revised pattern creating step comprises:

for each phrase in the example statement, identifying a pattern list for the phrase in the example statement, wherein the pattern list includes one or more elements that are substitutes for the phrase in the example. statement, and adding into the revised pattern the phrase in the example statement or the pattern list.

25. The computer-readable storage medium of claim 21, wherein identifying a pattern list comprises:

iterating through a set of pattern lists; and for each pattern list, matching the word or words in the example statement to the word or words in the pattern list.

26. The computer-readable storage medium of claim 25 further comprising:

generating a list of synonyms for the word or words in the example statement using a database containing synonyms.

* * * * *